US012154160B2

(12) United States Patent
Basin et al.

(10) Patent No.: US 12,154,160 B2
(45) Date of Patent: Nov. 26, 2024

(54) CONCEPT REFINEMENT USING CONCEPT ACTIVATION VECTORS

(71) Applicant: eBay Inc., San Jose, CA (US)

(72) Inventors: Dmitry Basin, Haifa (IL); Ido Ben-Shaul, Ramat HaSharon (IL)

(73) Assignee: eBay Inc., San Jose, CA (US)

( * ) Notice: Subject to any disclaimer, the term of this patent is extended or adjusted under 35 U.S.C. 154(b) by 224 days.

(21) Appl. No.: 18/050,378

(22) Filed: Oct. 27, 2022

(65) Prior Publication Data

US 2024/0144347 A1 May 2, 2024

(51) Int. Cl.
*G06Q 30/00* (2023.01)
*G06N 20/10* (2019.01)
*G06Q 30/0601* (2023.01)

(52) U.S. Cl.
CPC ......... *G06Q 30/0631* (2013.01); *G06N 20/10* (2019.01); *G06Q 30/0627* (2013.01)

(58) Field of Classification Search
None
See application file for complete search history.

(56) References Cited

U.S. PATENT DOCUMENTS 10,353,951 B1 * 7/2019 Li ......................... G06F 16/435
2016/0299975 A1 * 10/2016 Acar ................. G06F 16/24569
2017/0124447 A1 * 5/2017 Chang ................... G06F 16/951
2018/0089191 A1 * 3/2018 Obasanjo ............. G06F 16/334
2020/0089808 A1 3/2020 Liu
2023/0137671 A1 * 5/2023 Pavlovic ............. G06F 16/9538 707/723

OTHER PUBLICATIONS

Radford, A. et al., "Learning Transferable Visual Models From Natural Language Supervision", Retrived from Internet URL : https://arxiv.org/abs/2103.00020, pp. 48 (Feb. 26, 2021).
Kim, B., et al., "Interpretability Beyond Feature Attribution: Quantitative Testing with Concept Activation Vectors (TCAV)", Retrived from Internet URL : https://arxiv.org/abs/1711.11279, pp. 18 (Jun. 7, 2018).
Hedge, N., and Cai, C. J., et al., "Building SMILY, a Human-Centric, Similar-Image Search Tool for Pathology", Retrived from Internet URL : https://ai.googleblog.com/2019/07/building-smily-human-centric-similar.html, pp. 7 (Jul. 19, 2019).

(Continued)

*Primary Examiner* — Mila Airapetian
(74) *Attorney, Agent, or Firm* — Shook, Hardy & Bacon L.L.P.

(57) ABSTRACT

A search query and a concept comprising a feature are received from a user. Positive and negative item sets are identified, where items of the positive item set comprise the feature and items of the negative item set do not comprise the feature. A hyperplane located between the positive and negative item sets is generated using a machine learning model. A concept activation vector (CAV) orthogonal to the hyperplane is determined. The CAV is used to produce a modified search query vector. Based on comparing the modified search query vector with item vectors, a second set of search results is provided.

20 Claims, 15 Drawing Sheets

(56) References Cited

OTHER PUBLICATIONS

Goh, G., et al., "Multimodal Neurons in Artificial Neural Networks", Retrived from Internet URL : https://distill.pub/2021/multimodal-neurons/, pp. 26 (Mar. 4, 2021).
"CLIP: Connecting Text and Images", Open AI, Retrived from Internet URL : https://openai.com/blog/clip/, pp. 16 (Jan. 5, 2021).
European search report received for European Application No. 23206122.6, mailed on Feb. 12, 2024, 9 pages.

* cited by examiner

CONCEPT REFINEMENT USING CONCEPT ACTIVATION VECTORS

BACKGROUND

Search engines are used to identify and locate relevant search results accessible through the Internet. In some cases, a user may wish to narrow, modify, or filter a set of search results (e.g., items) based on a concept.

SUMMARY

At a high level, aspects described herein relate to modifying search query vectors based on user-provided concepts in a manner that may produce more accurate or complete search results.

When a user enters a search query at a search engine, a first set of search results can be provided based on the search query. The search engine may represent the search query as a search query vector, and the first set of search results may comprise a first set of items identified from an item index based on comparing the search query vector with item vectors associated with the first set of items.

A concept comprising a feature may be received—e.g., from a user. Positive and negative item sets may be identified, where items of the positive item set comprise the feature and items of the negative item set do not comprise the feature. A concept activation vector (CAV) may be generated using a machine learning model. In some embodiments, a hyperplane may be determined such that the hyperplane is located between the items of the positive item set and the items of the negative item set, and the CAV may be determined such that it is orthogonal to the hyperplane. A magnitude (or length) of the CAV may be determined based on an amount of separation between the items of the positive item set and the items of the negative item set.

Once determined, the CAV may be used to modify the search query vector. For example, the search query vector may be modified based on the position, magnitude, or direction of the CAV. Based on comparing the modified search query vector with the item vectors, a second set of search results may be provided.

This summary is intended to introduce a selection of concepts in a simplified form that is further described in the Detailed Description section of this disclosure. The Summary is not intended to identify key or essential features of the claimed subject matter, nor is it intended to be used as an aid in determining the scope of the claimed subject matter. Additional objects, advantages, and novel features of the technology will be set forth in part in the description which follows, and in part will become apparent to those skilled in the art upon examination of the disclosure or learned through practice of the technology.

BRIEF DESCRIPTION OF THE DRAWINGS

The present technology is described in detail below with reference to the attached figures, wherein.

DETAILED DESCRIPTION

Figure 1:
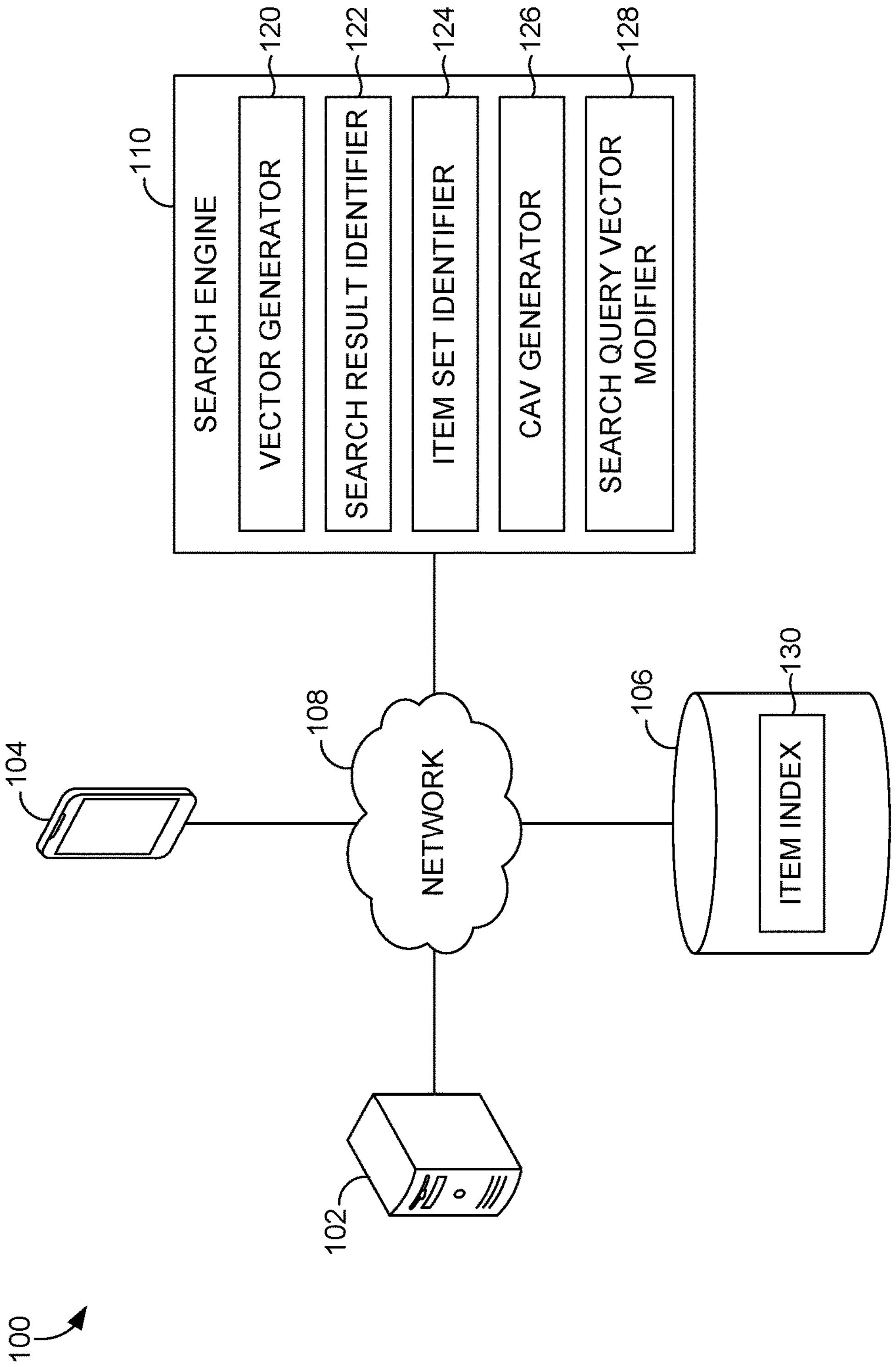
FIG. 1 is an example operating environment in which the technology can be employed, in accordance with an aspect described herein.

In search and retrieval technology, it can be difficult to reliably generate or narrow search results (e.g., items) based on a concept. A traditional search engine may, for example, fail to identify items relevant to the user due to a lack of understanding as to what distinguishes items comprising the concept from items not comprising the concept. For example, an online shopper who searches for "table" may wish to narrow an associated set of search results to tables with marble tops. A traditional search engine may, for example, search an item description associated with a table for the term "marble" in order to determine whether the table has a marble top. However, this approach is susceptible to both type I and type II errors. That is to say, the traditional search engine may, for example, incorrectly classify a first table with marble drawer handle as having a marble top if a first item description associate with the first table comprises the word "marble". Similarly, a traditional search engine may fail to identify a second table that does comprise a marble top if, for example, a second item description associated with the second table does not comprise the word "marble." Thus, search engines may produce more accurate and complete search results if configured to distinguish items comprising a given concept from items that do not comprise the given concept.

A search engine's ability to understand searched-for concepts is essential to the navigation and function of the Internet. The Internet comprises countless data sources from which information can be accessed by a browser. Generally, the exact internet address—e.g., of a listing of a for-sale item—is not known. That is because Internet addresses are complex due to the myriad of possible connections. Nor are they intuitive, as the complex addresses do not represent the information that may be viewed at the web address.

For these reasons, search engines are essential for Internet navigation, as they identify web addresses and recall information accessible via the web addresses. To be effective, however, search engines need to understand searched-for concepts, since a failure to properly understand a concept can lead to the inability of the search engine to identify and present useful web addresses.

To provide a simplified example, at the time of drafting this application, the search query "table" was entered into a commonly used Internet search engine. The search engine identified over 1.2 billion search results. The search results included web pages comprising tables of varying finishes, colors, sizes, shapes, heights, materials, and prices, for example. In order for a user to successfully locate a table with a desired set of characteristics, it is essential that a search engine properly identify tables that comprise searched-for concepts, features, and the like. Otherwise, a user searching for, for example, a small, round table with a marble top may never be able to locate their desired table due to the incredible number of possible combinations of table-related characteristics. A failure by the search engine to properly understand or identify even one user-provided concept (e.g., "marble top," "round," or "short") may dilute the concentration of accurate search results to a point where the user is only able to locate few, if any, tables of the desired configuration. Put another way, for any given search query, even one as simple as this example, there are generally so many possible search results that any small error in identifying accurate results can lead to the inability to properly navigate the Internet.

Conventional search engines seek to solve this problem by, for example, providing users with preconfigured filters. In some cases, such filters take the form of user-selectable checkboxes. For example, after searching "table," a user may be presented with a set of checkboxes labeled "round," "square," and "rectangular." Selecting "round" may filter out non-round tables.

While preconfigured filters may aid users in narrowing sets of search results, they inherently limit users to a predefined set of filtering options. For example, instead of (or in addition to) filtering a set of tables based on simple characteristics such as shape or size, a user may wish to filter based on the material from which the tabletop is made, which may be comparatively less likely to be included as a preconfigured filter. Put another way, it is impossible for a search engine programmer to anticipate every way users will want to filter search results.

Conventional search engines may also seek to solve the above-identified problem by providing users with the ability to enter a narrowing characteristic in a search box alongside an initial search query. For example, if an online shopper who searches for "table" wishes to narrow an associated set of search results to tables with marble tops, the shopper may replace their initial search query ("table") with "table with marble top." The traditional search engine then may, for example, query web pages for the text string "table with marble top" or query web pages for instances where "table" and "marble top" appear separately. But if a web page associated with a table does not expressly include the text string "marble top" (or even "marble"), the traditional search engine may fail to include the table in a set of search results—even if the table does, in fact, have a marble top.

To solve these problems, the disclosed technology, at a high level, leverages machine learning to learn to identify search results (e.g., items) that comprise a user-identified feature. The disclosed technology may accomplish this goal by gathering two sets of items: a first set of items that comprise the feature (a "positive item set") and a second set of items that do not comprise the feature (a "negative item set"). By representing the search query and the items as vectors and generating a concept activation vector (as described in more detail below), the technology can, in a sense, move the original search query "toward" the desired concept or feature in the vector space. This approach may allow users to identify more relevant search results based on a custom concept—or, in a sense, to create custom filters.

Such methods improve the ability to understand searched-for concepts and improve search customization, therefore providing more accurate search results and improving the ability to navigate the Internet using a search engine. In part, this is a result of the improved machine learning methods disclosed herein. Further, using machine learning to move search queries in the vector space toward a desired concept allows a user to identify relevant search results that may not have been included in an initial set of search results, in contrast to traditional filtering methods that simply limit the initial set of search results to a narrower subset.

One method that achieves these benefits is a computerized method that modifies a search query based on a concept activation vector (CAV). The search query (e.g., "table") may be received from a user and may be represented as a vector (a "search query vector"). If the user wishes to narrow their search based on a concept (e.g., "marble top"), such a concept may be received as a concept input from the client device. In order to determine how to distinguish a table comprising a marble top from a table comprising any other type of top, an item index—e.g., a database of items—may be queried. Items in the item index may comprise associated item images or item descriptions. By searching such item images or item descriptions (e.g., for "marble top"), it may be possible to compile a set of items that comprise the feature (a "positive item set") and a set of items that do not comprise the feature (a "negative item set"). The items in the positive and negative item sets may be represented as vectors ("item vectors").

The method leverages a machine learning model to learn what distinguishes items in the positive item set from items in the negative item set. Specifically, a CAV may be generated using a machine learning model, such as a support-vector machine (SVM). This may be accomplished by determining a separator—e.g., a hyperplane—that separates the items of the positive item set and the items of the negative item set in the vector space. The CAV may be determined such that it is orthogonal to the hyperplane and oriented toward the items of the positive item set. Put another way, the CAV may indicate a direction in which the positive item set is located relative to the negative item set. Furthermore, a magnitude (or length) of the CAV may be determined based on an amount of separation between the items of the positive item set and the items of the negative item set.

Once determined, the CAV may be used to modify the search query vector. For example, the search query vector may be translated, rotated, shortened, or lengthened based on the position, magnitude, or direction of the CAV. Then, based on comparing the modified search query vector with the item vectors of items in the item index, a second set of search results may be provided. Because the modified search query vector has been modified based on the CAV (which, in turn, is based on the concept), the second set of search results may reflect the concept.

Throughout this disclosure, some aspects of the technology are described in the context of ecommerce items. However, it will be understood that the invention is not limited to this context alone, as it is more generally applicable to most Internet search engines. As such, it is intended that some language should be broadly interpreted. For instance, where the application describes items listings on an item index, it is intended that this also include other possible search results, such as webpages and the like, which may be entirely unrelated to an "item" for sale on a website. In the same spirit, an "item description" is to be broadly interpreted to include any description for a search result, such as text or images provided at a webpage associated with the search result. Accordingly, terms such as "item index" can encompass a database of any potential search results, and once again, is not intended to limit the technology to implementations related to items for sale.

It will be realized that the methods previously described are only examples that can be practiced from the description that follows, and they are provided to more easily understand the technology and recognize its benefits. Additional examples are now described with reference to the figures.

With reference now to FIG. 1, an example operating environment 100 in which aspects of the technology may be employed is provided. Among other components or engines not shown, operating environment 100 includes server 102, client device 104, and datastore 106, each of which is illustrated communicating across network 108.

Generally, server 102 is a computing device that implements functional aspects of operating environment 100, such one or more functions of search engine 110, to facilitate providing search results for a search query, for example. One suitable example of a computing device that can be employed as server 102 is described as computing device 1300 with respect to FIG. 13. In implementations, server 102 represents a back-end or server-side device. Server 102 may receive a search query from client device 104, and identify search results for the search query using search engine 110, which server 102 may provide to client device 104 in response to receiving the search query.

Client device 104 is generally a computing device that can receive a search query from a user and provide the search query to server 102 for identification of search results. Client device 104 may present the search results, or other information, to the user. One suitable example of a computing device that can be employed as client device 104 is described as computing device 1300 with respect to FIG. 13. In implementations, client device 104 is a client-side or front-end device. In addition to server 102, client device 104 may implement functional aspects of operating environment 100, such one or more functions of search engine 110, to provide search results or other information to a user. It will be understood that some implementations of the technology will comprise either a client-side or front-end computing device, a back-end or server-side computing device, or both executing any combination of functions, some examples of which will be further described, to identify and provide search results, or other information, to a user.

Network 108 may include one or more networks (e.g., public network or virtual private network "VPN") as shown with network 108. Network 108 may include, without limitation, one or more local area networks (LANs) wide area networks (WANs), or any other communication network or method.

Datastore 106 generally stores information including data, computer instructions (e.g., software program instructions, routines, or services), or models used in embodiments of the described technologies. Although depicted as a single database component, data store 106 may be embodied as one or more data stores or may be in the cloud.

To identify search results, components of operating environment 100 may employ search engine 110. Search engine 110 may include computer-readable instructions that may be stored within database 106 for use by components of operating environment 100.

Having identified various components of operating environment 100, it is again emphasized that any additional or fewer components, in any arrangement, may be employed to achieve the desired functionality within the scope of the present disclosure. Although the various components of FIG. 1 are shown with lines for the sake of clarity, in reality, delineating various components is not so clear, and metaphorically, the lines may more accurately be grey or fuzzy. Although some components of FIG. 1 are depicted as single components, the depictions are intended as examples in nature and in number and are not to be construed as limiting for all implementations of the present disclosure. The functionality of operating environment 100 can be further described based on the functionality and features of the previously listed components. Other arrangements and elements (e.g., machines, interfaces, functions, orders, and groupings of functions, etc.) can be used in addition to or instead of those shown, and some elements may be omitted altogether.

Further, many of the elements described in relation to FIG. 1, for instance, those described in relation to search engine 110, are functional entities that may be implemented as discrete or distributed components or in conjunction with other components, and in any suitable combination and location. Various functions described herein are being performed by one or more entities and may be carried out by hardware, firmware, or software. For instance, various functions may be carried out by a processor executing computer-executable instructions stored in memory. Moreover, the functions described in relation to FIG. 1 may be performed by server 102, client device 104, or a combination of both.

To identify and return search results, client device 104 may receive and provide a search query at a search engine webpage, application, or the like that is associated with search engine 110. A search query can be provided in any form, including text, images, audio, video, or the like. Client device 104 may provide the search query to server 102 to identify search results, which can be provided back to client computing device 104 for presentation at a user interface. In some cases, client device 104 can receive and provide a concept input to server 102 in order to modify a set of search results.

As part of identifying search results or modifying search results based on a concept input, server 102 can employ search engine 110. In general, search engine 110 modifies a search query vector (which may be based on a search query received from client computing device 104) based on a concept input. The modified search query vector may be used to produce a second set of search results that are refined, modified, or narrowed based on the concept input. Put another way, the second set of search results may comprise items related to a user-provided concept input.

In doing so, search engine 110 may employ vector generator 120, search result identifier 122, item set identifier 124, concept activation vector generator 126, or search query vector modifier 128.

Search query engine 110 may employ vector generator 120 to generate vectors for search queries or items. Search results may comprise "items," which is broadly the information associated with the search results, including text, images, and the like. For instance, a search result may be associated with a webpage comprising text or images that are considered "items." A search engine that is suitable for use as search engine 110 generally identifies search results comprising items that are related to the initial search query. In a specific example, a search engine for an online marketplace can identify search results in the form of item listings, which can include items comprising goods or services for sale on the online marketplace. Such a webpage may comprise an "item description" associated with the item; the item description can include any portion of information describing the item. For instance, an item description can comprise a title, an image, an abstract, a discussion, a list of technical specifications, and so on describing the item. Any portion of the webpage—e.g., the title, image, abstract, or discussion—can be an "item description." In a particular context, the item description is a piece of labeled structured data for an item. For instance, an item listing on an item listing database of an online marketplace comprises a title of the item, a description of the item, an image of the item, and so on. The title, description, image, etc. can be referred to as the item description. In one suitable use case of the technology, the title of an item listing has been identified as useful as the item description when implementing the described technology.

Vector generator 120 can be used to generate a search query vector, such as search query vector 802 (shown in FIG. 8) for a given search query, such as search query 202 (shown in FIG. 2). That is, vector generator 120 generates a vector representation of a search query. The search query may be a text string or an image, for example, and may be provided by a user—e.g., at the client device 104. Vector generator 120 can use methods such as Word2Vec, fastText, BERT (Bidirectional Encoder Representations from Transformers), and the like to generate a search query vector. In an aspect, a pretrained BERT model is fine-tuned on an item listing catalogue comprising items, such as those within item index 130, and based on the training, is configured to receive an input, such as text or an image, and generate a vector output in response.

Figure 3:
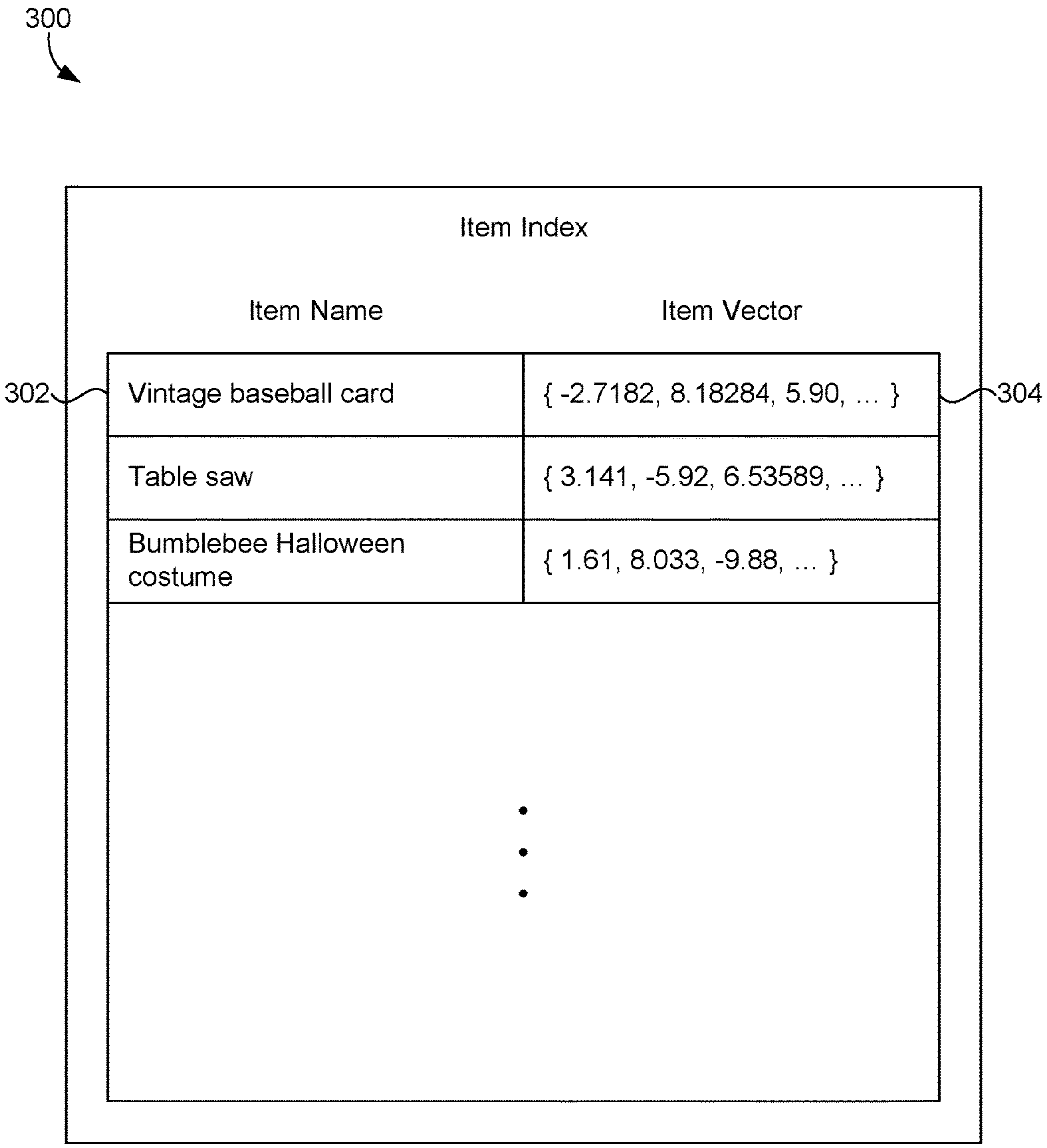
FIG. 3 illustrates an example item index, in accordance with an aspect described herein.
Figure 4:
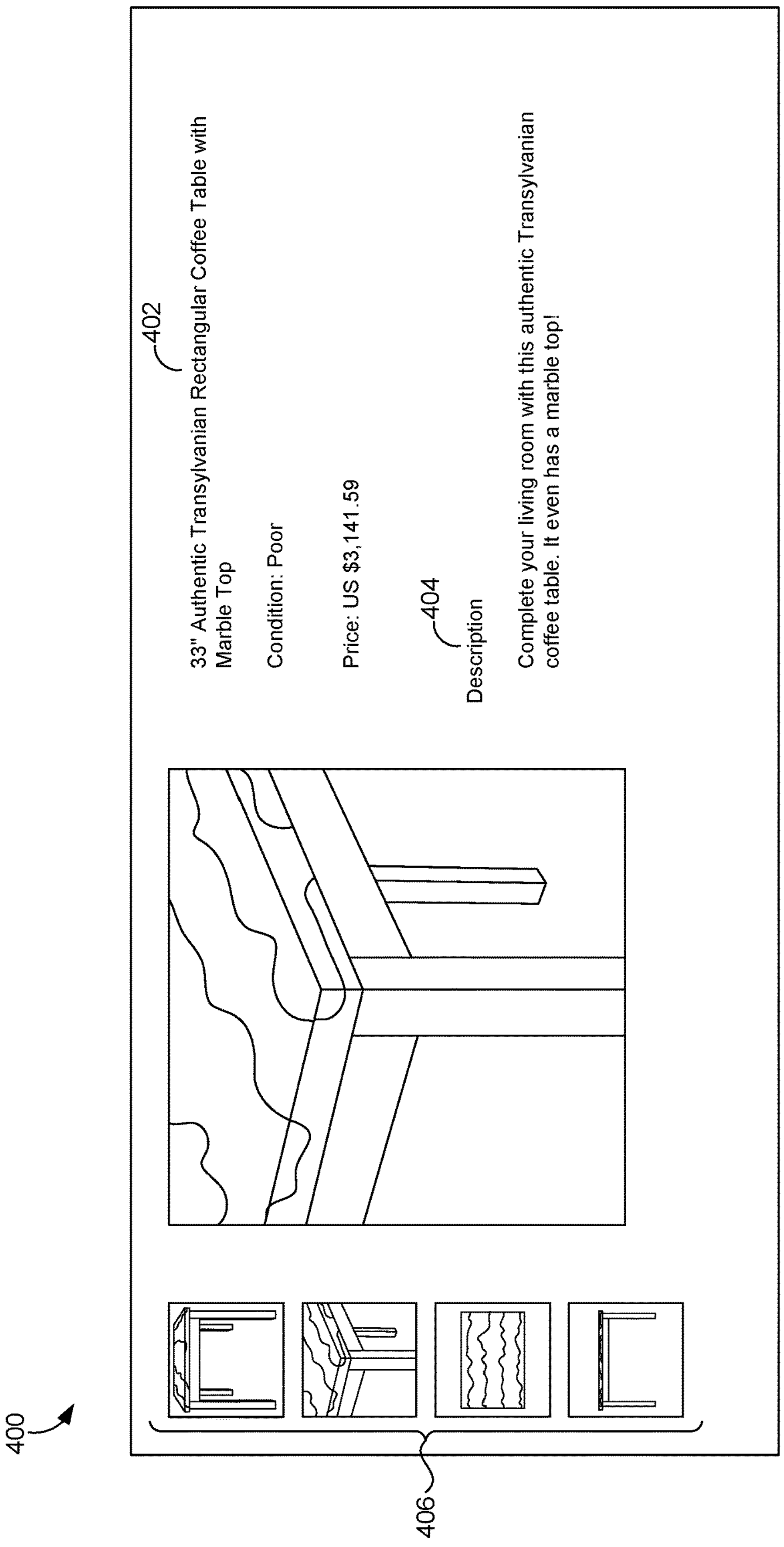
FIG. 4 illustrates an example item description, in accordance with an aspect described herein.

Vector generator 120 can also be used to generate item vectors, such as item vector 304 (shown in FIG. 3) from item descriptions, such as item description 400 (shown in FIG. 4). That is, vector generator 120 generates a vector representation of an item description. Item vector 304 may be associated with an item name 302. Vector generator 120 may generate a vector representation of a text or an image of the item description. Vector generator 120 can use methods such as Word2Vec, fastText, BERT, and the like to generate an item vector, as previously described. Item vectors may be stored in the item index 130 (which corresponds to item index 300 of FIG. 3).

Having received search query vector from the vector generator 120, search result identifier 122 can be used to identify search results for the search query vector. One method of identifying the search results includes executing the search query vector at a search engine (such as search engine 110) and retrieving the results from item index 130. The search results can be provided in response to receiving the search query (e.g., search query 202) from client computing device 104. In an aspect, search result identifier 122 identifies search results from item index 130 using a received vector, such as a search query vector or modified search query vector, as will be described. Search result identifier 122 compares the received vector to the item vectors in item index 130 to identify search results. For instance, search result identifier 122 may employ a k-NN (k-nearest neighbors) algorithm to determine item vectors in the vector space that are within a learned distance from the input vector. Search result identifier 122 may identify the items associated with the determined item vectors and provide the items in the form of search results responsive to the input vector, e.g., responsive to receiving a search query vector associated with a search query or modified search query vector associated with a modified search query.

Figure 2A:
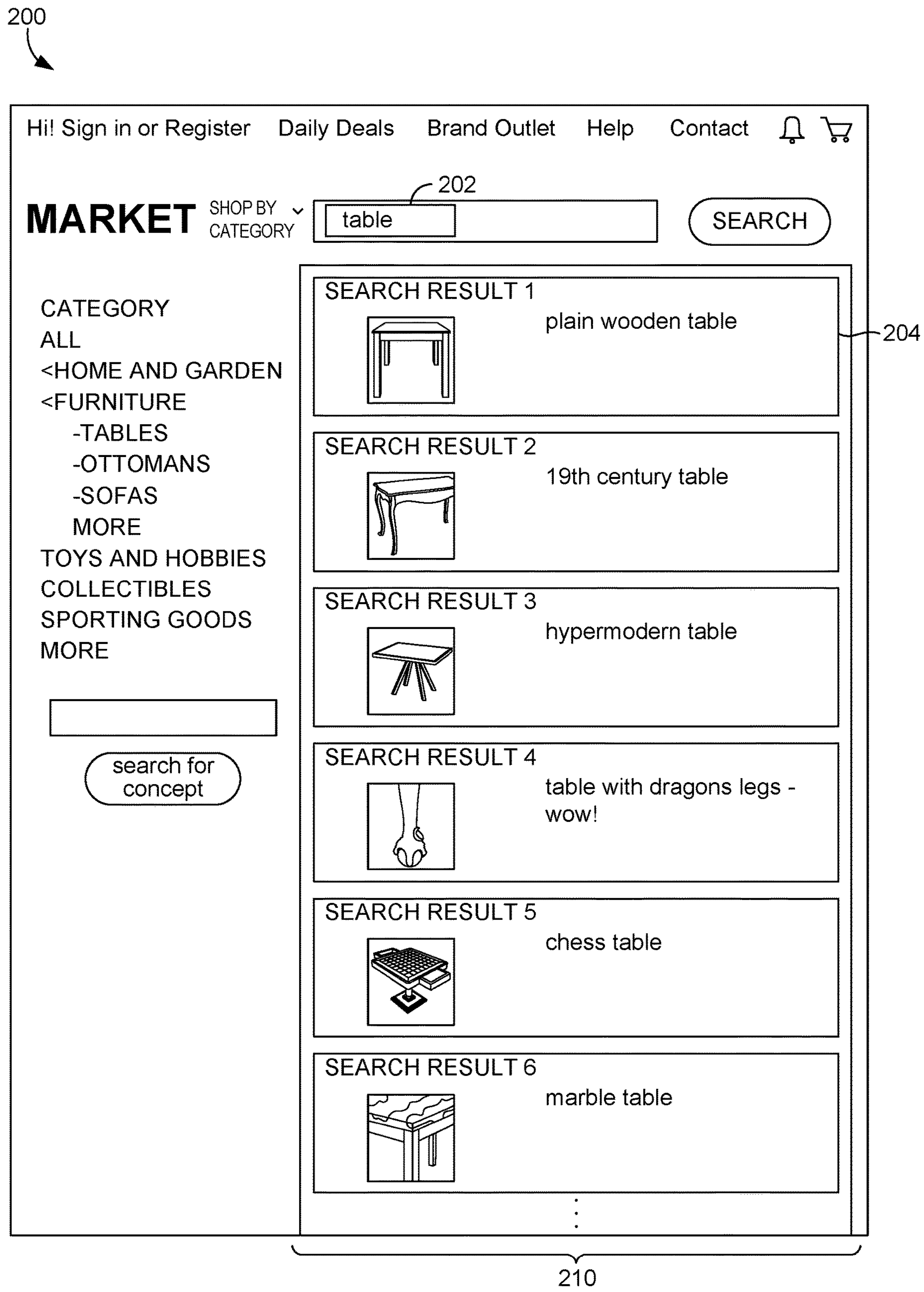
FIGS. 2A-2C are example interfaces having an example search query and an example first set of search results, where the search results can be determined by components of FIG. 1, in accordance with an aspect described herein.

To provide a continued illustrated example, FIG. 2A depicts example interface 200 comprising first set of search results 210 for search query 202 for "table." Here, search query 202 for "table" has been received at a search engine, such as search engine 110. Search engine 110 of FIG. 1, including vector generator 120, can be employed to convert the text string "table" into a search query vector and return a first set of search results 210, including search result 204. As an example, search result identifier 122 of search engine 110 may identify an item listing having a title "plain wooden table" (i.e., search result 204) as a search result for the search query "table."

Figure 2B:
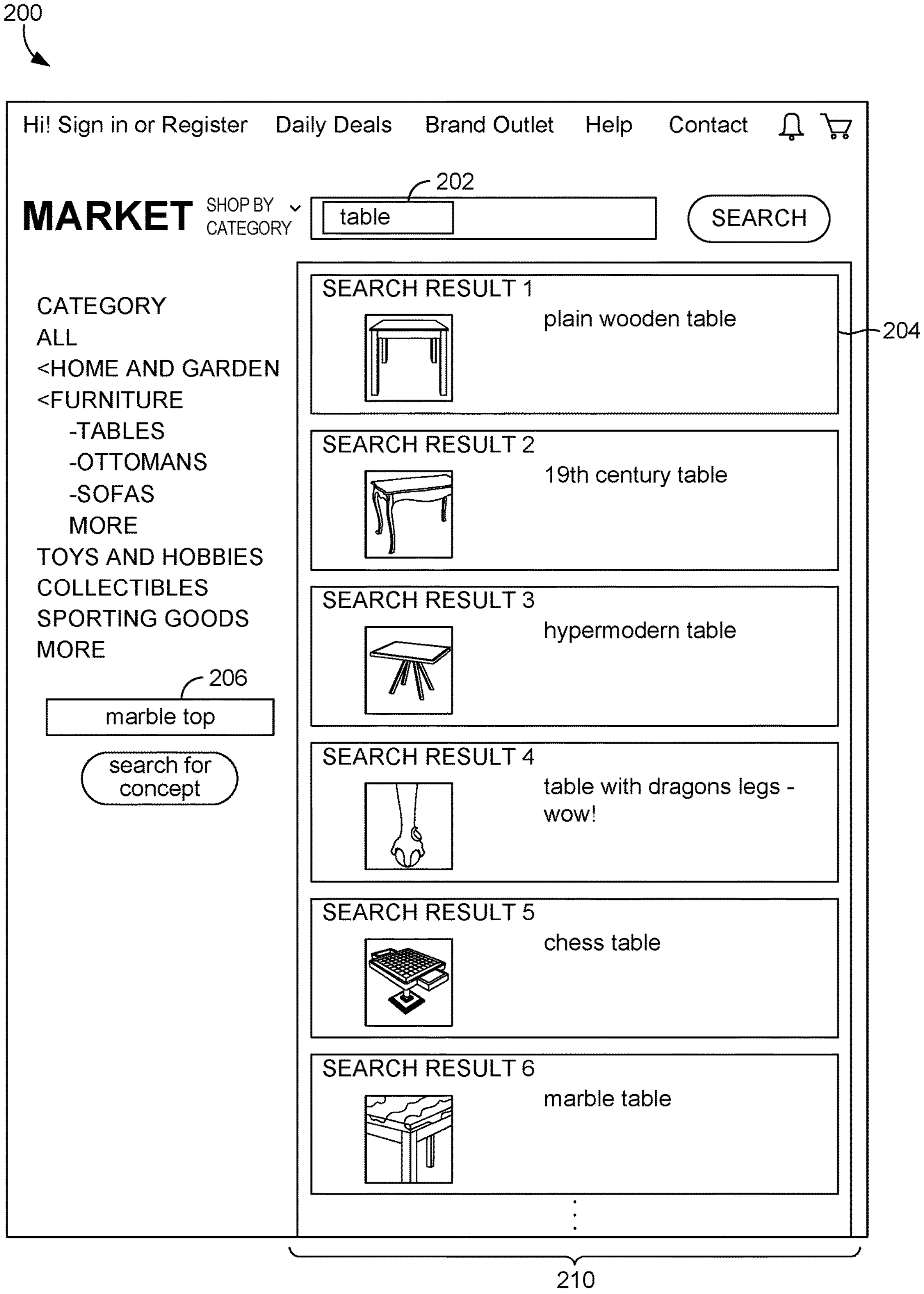
Figure 2C:
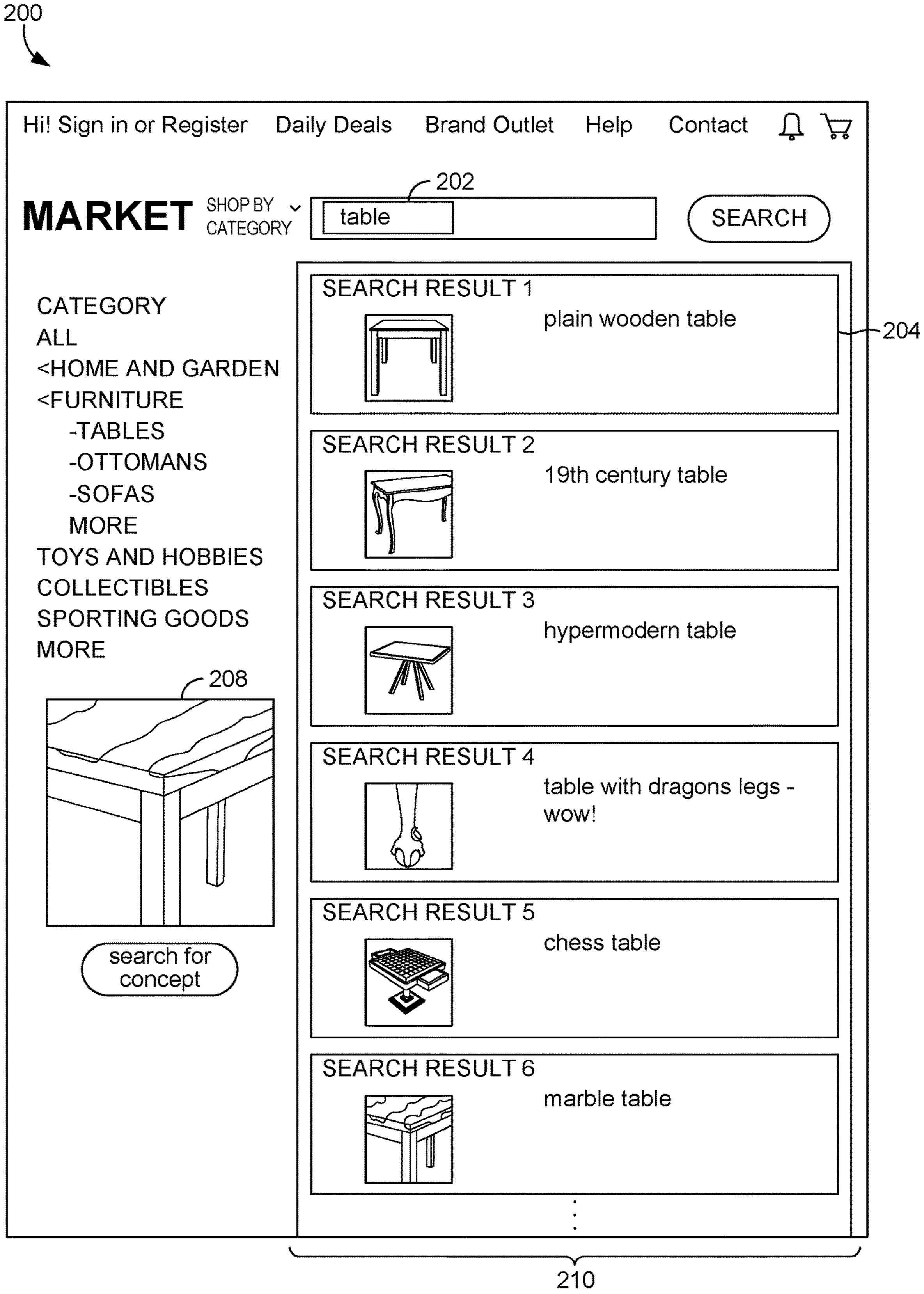

As shown in FIG. 2B, example interface 200 may provide a user with the ability to provide a concept input, such as textual concept input 206. In some cases, example interface 200 may provide the user with the ability to provide two or more concept inputs. As an example, a user may provide two or more concept inputs as one input or through an iterative process that provides the two or more concept inputs as separate inputs. The concept input may be received at a search engine 110 from the client computing device 104. The concept input may comprise a text string (as shown with respect to textual concept input 206 in FIG. 2B) or an image (as shown with respect to image concept input 208 in FIG. 2C), for example. The concept input may comprise a feature—e.g., a feature related to the search query. For example, a user who enters the search query "table" may provide a concept input comprising features such as "marble top," "round," "glass," "antique," or "tall." In some instances, the concept input may comprise multiple concepts or features. Alternatively, or in addition, the user may provide an image concept input comprising, for example, an image of a table comprising one or more features.

In an aspect, a purpose of the concept input is to provide a user with a way to refine, modify, or narrow a set of search results, such as first set of search results 210, based on a concept. For example, as depicted in FIG. 2B, a user may enter search query "table" and want to identify a related set of search results by the concept "marble top" in order to view tables comprising marble tops.

Given a concept input comprising a feature, such as textual concept input 206, item set identifier 124 may identify a positive item set and a negative item set from item index 130. In cases involving multiple concept inputs, multiple positive item sets and multiple negative item sets might be determined. With brief reference to FIG. 5, an illustration is provided that depicts a procedure for item set identification 500. Item set identifier 124 may identify items from item index 300. As shown, item set identifier 124 identifies at least one item (e.g., first item 508) to include in positive item set 502 and at least one item (e.g., second item 506) to include in negative item set 504. Positive item set 502 may comprise at least one item comprising the feature (e.g., first item 508); negative item set 504 may comprise at least one item that does not comprise the feature (e.g., second item 506). In some cases, the positive and negative item sets may include a predefined number of items that do and do not comprise the feature, respectively, which may result in more accurate search result refinement. Put another way, samples of items from the item index 130 may produce more accurate results when used to generate a vector for modifying the search query vector, as will be described. In some aspects, positive item set 502 may comprise one hundred, two hundred, or more items that comprise the feature, for example. Likewise, negative item set 504 may comprise one hundred, two hundred, or more items that do not comprise the feature, for example. Any number of items may be set as the predefined number of items to include in the positive item set 502 and the negative item set 504. In an aspect, the positive item set 502 and the negative item set 504 comprise an equal number of items.

Figure 5:
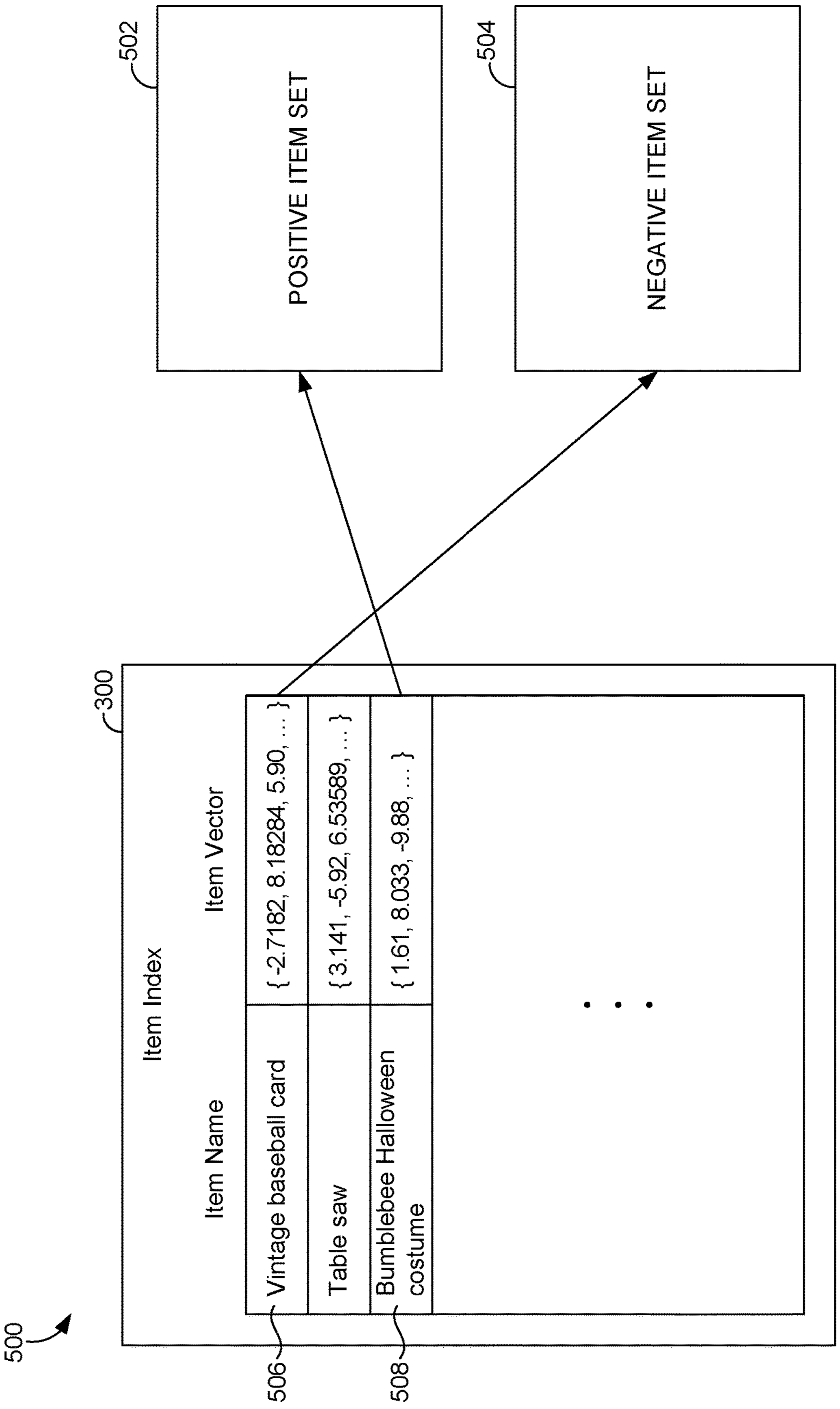
FIG. 5 illustrates the identification of positive and negative item sets from items in an item index, which can be performed by components of FIG. 1, in accordance with an aspect described herein.

Item set identifier 124 may identify positive item set 502 and negative item set 504 from item index 300 (as shown in FIG. 5). That is, positive item set 502 and negative item set 504 may comprise items from item index 300. The items in positive item set 502 and negative item set 504 may be respectively associated with item vectors, such as item vector 304.

Item set identifier 124 may take one or more factors into consideration when determining whether an item from item index 300 comprises the feature (and thus is a candidate for inclusion in positive item set 502) or does not comprise the feature (and thus is a candidate for inclusion in negative item set 504). For example, if the concept input comprises a text string, item set identifier 124 may determine whether an item description associated with the item (e.g., item description 400, shown in FIG. 4) comprises the text string or part of the text string. Alternatively, or in addition, if the concept input comprises a text string, item set identifier 124 may determine whether a title associated with the item (e.g., item title 402) comprises the text string or part of the text string. Likewise, if the concept input comprises an image, item set identifier 124 may determine whether an item description associated with the item (e.g., item description 400), such as a title associated with the item (e.g., item title 402) or a summary associated with the item (e.g., item summary 404), comprises the feature illustrated in the image. In some cases, when the concept input comprises an image, item set identifier 124 may determine a text string corresponding to the feature in the image and determine whether an item description associated with the item (e.g., item description 400), such as a title associated with the item (e.g., item title 402), comprises the text string.

In some cases, item set identifier 124 may repeat the process described above (i.e., assigning the item to the positive item set, the negative item set, or neither based on whether the item comprises the feature) until positive item set 502 reaches a positive item set threshold and negative item set 504 reaches a negative item set threshold. In other words, the process may repeat until the positive and negative items sets each contain a predetermined number of items. As discussed above, in some aspects, the predetermined number of items may be one hundred, two hundred, or more, for example. Upon reaching the predetermined number of items, item set identifier 124 may terminate the process of identifying items from item index 130 and provide the positive item set 502 and the negative item set 504 for use by other components of search engine 110.

In other cases, the number of items in positive item set 502 and negative item set 504 may not be predetermined and may instead depend on one or more factors. For example, item set identifier 124 may stop adding items to positive item set 502 based on a determination that item index 300 does not comprise additional items (i.e., items that have not already been added to positive item set 502) that comprise the feature. Similarly, item set identifier 124 may stop adding items to negative item set 504 based on a determination that item index 300 does not comprise additional items that do not comprise the feature.

Figure 6:
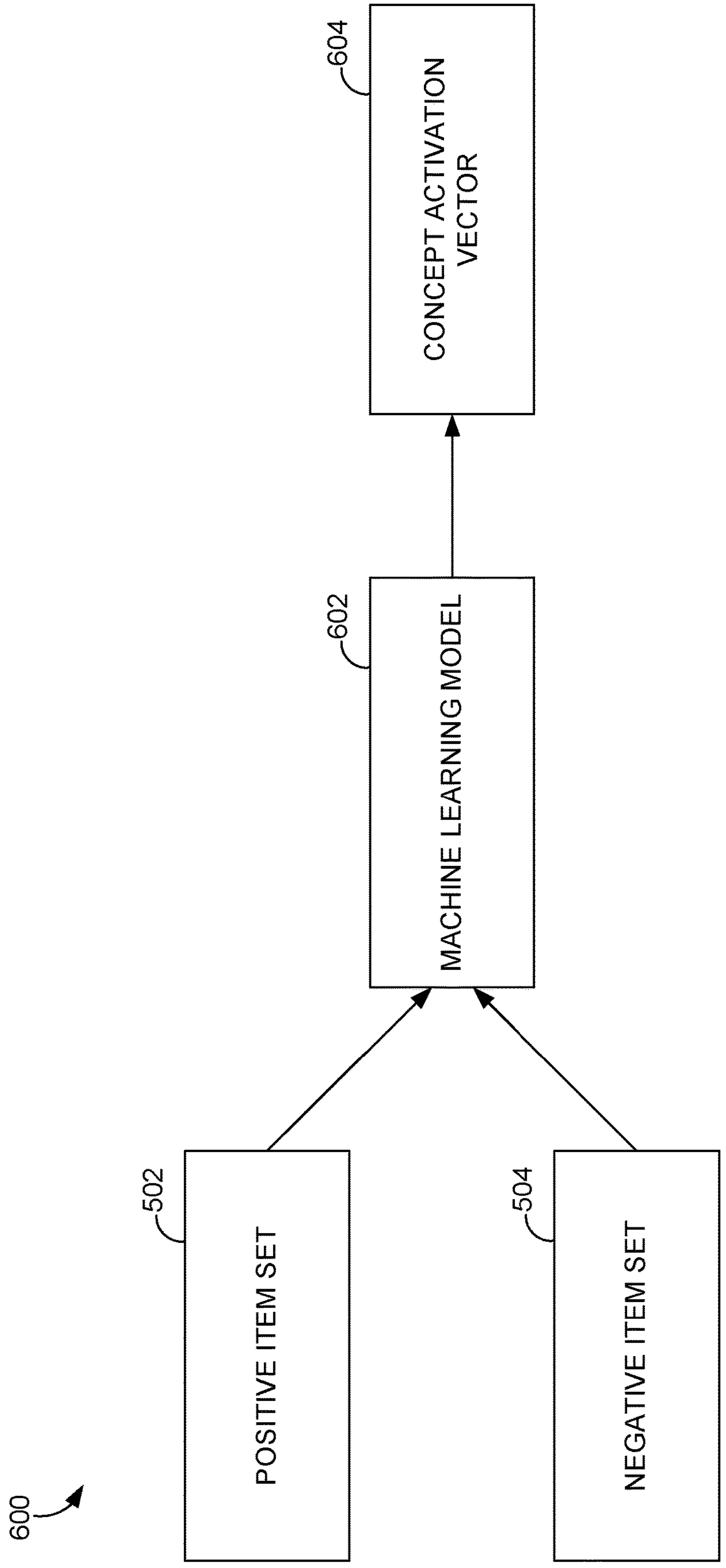
FIG. 6 illustrates a process of generating a concept activation vector using a positive item set, a negative item set, and a machine learning model, which can be performed by components of FIG. 1, in accordance with an aspect described herein.

FIG. 6 depicts a procedure 600 for generating a concept activation vector (CAV). CAV generator 126 may generate, a using machine learning model 602, a CAV 604 based on positive item set 502 and negative item set 504, as shown in FIG. 6. As previously discussed, items in positive item set 502 and items in negative item set 504 may be respectively represented by item vectors (e.g., item vector 304). Machine learning model 602 may generate CAV 604 based on positive item set 502 and negative item set 504. Machine learning model 602 may be a support-vector machine, for example.

With continued reference to FIG. 6, in order to generate CAV 604, machine learning model 602 may determine a separator that separates positive item set vectors and negative item set vectors in the vector space. In cases involving multiple concept inputs, multiple separators may be determined. In some cases, the separator may be a hyperplane. For example, if the positive item set vectors and the negative item set vectors are n-dimensional vectors, the separator may be a hyperplane having n−1 (or more) dimensions.

Based on the separator, machine learning model 602 may determine CAV 604. In cases involving multiple concept inputs (and therefore multiple separators), multiple CAVs may be determined. At a high level, CAV 604 may represent a spatial relationship between the positive item set vectors and the negative item set vectors. Machine learning model 602 may determine a direction of CAV 604, where the direction of CAV 604 is orthogonal to the separator and toward the positive item set vectors. Put another way, CAV 604 may indicate a direction of the positive item set vectors relative to the negative item set vectors. Additionally, machine learning model 602 may determine a length of CAV 604 based on an amount of separation between the positive item set vectors and the negative item set vectors. For example, the greater the average distance between the positive item set vectors and the negative item set vectors, the greater CAV's 604 length may be.

As previously mentioned, machine learning model 602 may be an SVM. The SVM may utilize a linear kernel. In such cases, the SVM may determine a hyperplane that separates positive item set vectors and negative item set vectors in the vector space. If the positive item set vectors and negative item set vectors are n-dimensional vectors, the hyperplane may comprise n−1 or more dimensions. Based on the hyperplane, the SVM may determine CAV 604. The SVM may determine a direction of CAV 604, where the direction of CAV 604 is orthogonal to the hyperplane and toward the positive item set vectors. The SVM may determine a length of CAV 604 based on an amount of separation between the positive item set vectors and the negative item set vectors as previously described.

Figure 7:
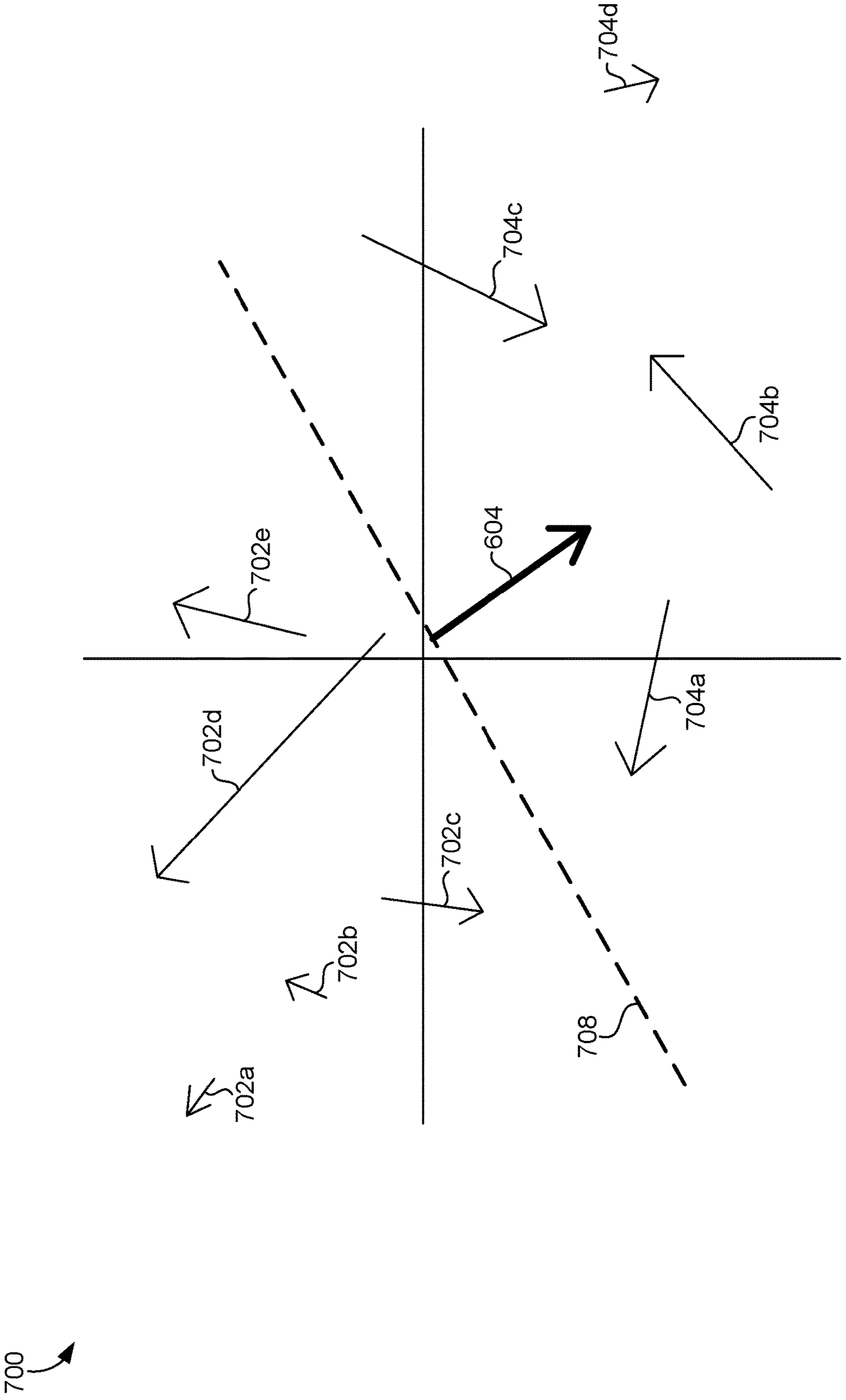
FIG. 7 illustrates an example separator and concept activation vector relative to positive and negative item set vectors in accordance with an aspect described herein.

FIG. 7 is an example illustration of the vector space 700 describe above with reference to FIG. 6. Positive item set vectors 704*a-d* and negative item set vectors 702*a-e* are separated by separator 708. CAV 604 is orthogonal to separator 708 and oriented toward positive item set vectors 704*a-d*.

Figure 8:
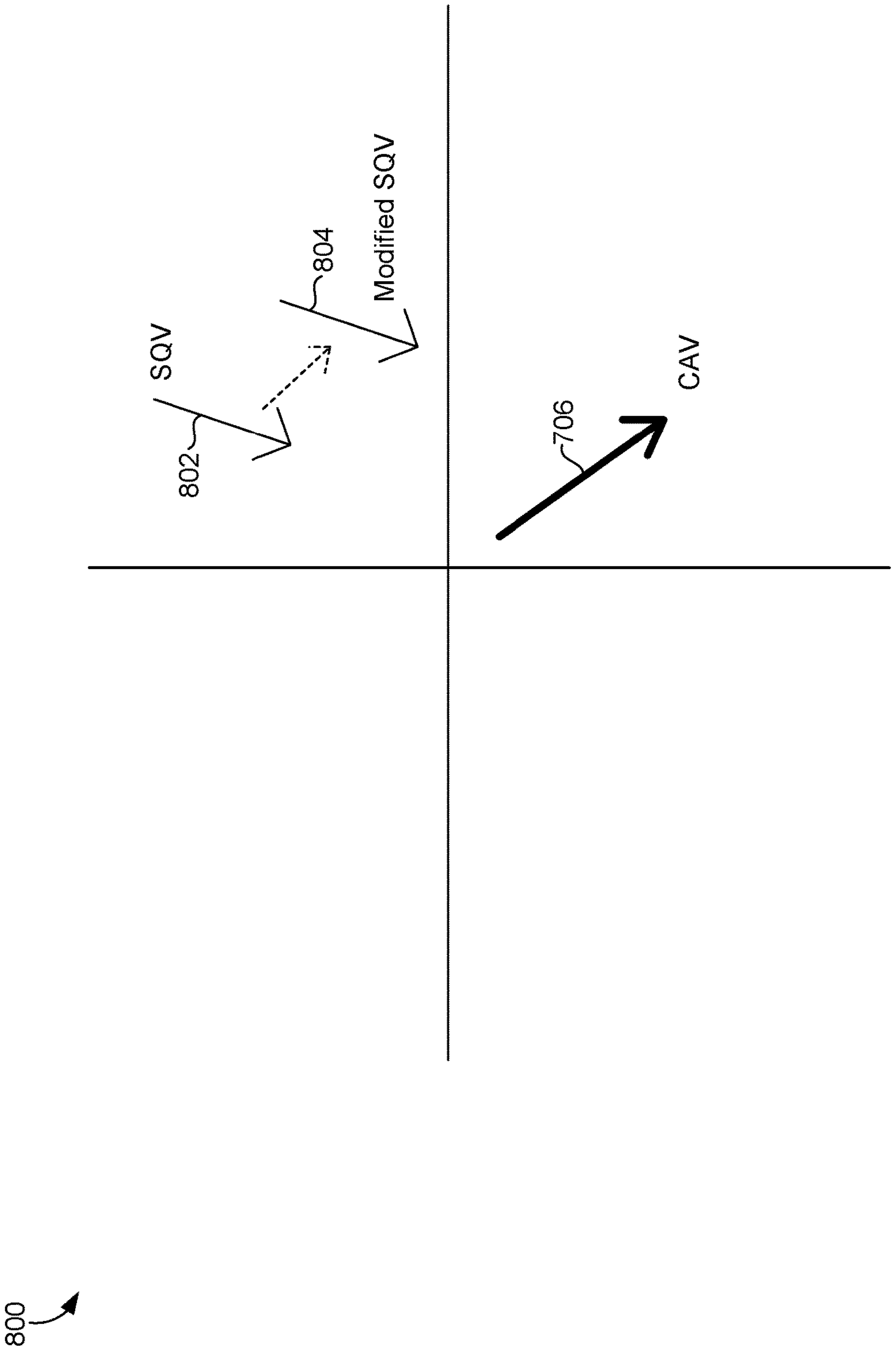
FIG. 8 illustrates the modification of an example search query vector based on an example concept activation vector, which can be performed by components of FIG. 1, in accordance with an aspect described herein.

Search query vector modifier 128 may, as shown in FIG. 8, modify a search query vector 802 (which may be generated by vector generator 120 based on search query 202, as previously discussed) based on CAV 604 to produce modified search query vector 804. In some cases, search query vector modifier 128 may modify search query vector 802 by translating, rotating, shortening, or lengthening search query vector 802 based on the position, magnitude, or direction of CAV 604 in vector space 800, thus producing modified search query vector 804. In some cases, search query vector modifier 128 may modify search query vector 802 by arithmetically adding search query vector 802 and CAV 604, resulting in modified search query vector 804. In cases involving multiple concept inputs (and therefore multiple CAVs), search query vector 802 may be arithmetically added to the multiple CAVs. In such cases, the multiple CAVs may be weighted by a weight factor. For example, if there are three CAVs, each of the three CAVs may be weighted by a factor of one third. However, in other cases, the CAVs may be weighted by different (i.e., non-identical) weight factors.

Additionally, although positive item set vectors 704*a-d* and negative item set vectors 702*a-e* are depicted in FIG. 7 and FIG. 8 as two-dimensional vectors, this is merely an example; the vectors may possess any number of dimensions, as would be understood by one of ordinary skill in the art.

Figure 9:
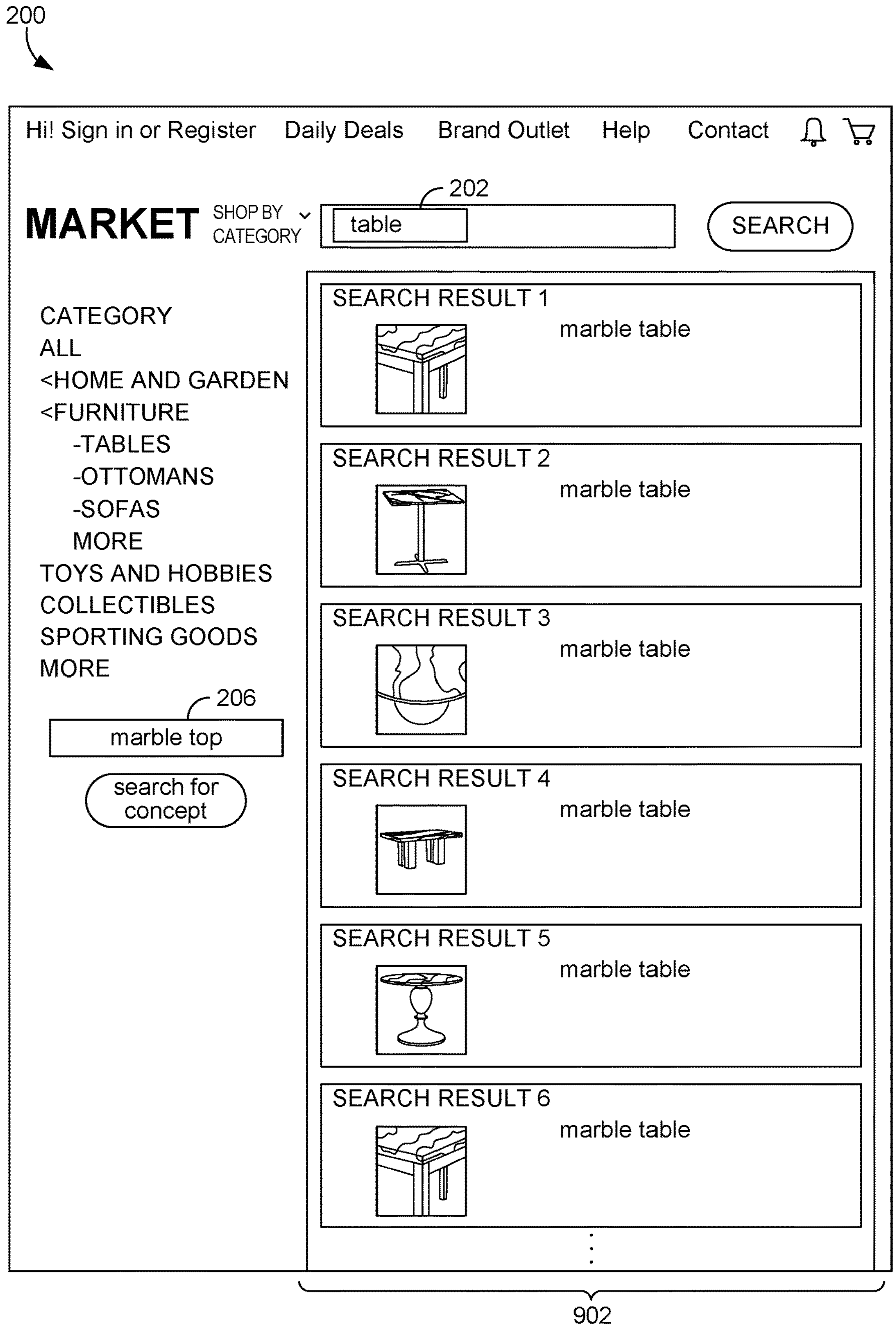
FIG. 9 illustrates an example interface having a second set of search results, in accordance with an aspect described herein.

As shown in FIG. 9, search result identifier 122 may provide a second set of search results 902 comprising a second set of items identified from item index 300 based on comparing modified search query vector 804 with item vectors corresponding to items of item index 300. As previously discussed, search result identifier 122 may employ a k-NN (k-nearest neighbors) algorithm to determine item vectors in the vector space that are within a learned distance from the input vector. Search result identifier 122 may identify the items associated with the determined item vectors and provide the items in the form of search results responsive to the input vector, e.g., responsive to receiving a search query vector associated with a search query or modified search query vector associated with a modified search query.

Because modified search query vector 804 is produced based at least in part on CAV 604 (which may be based on a concept input that comprises a feature), second set of search results 902 may comprise items that comprise the feature. Continuing with the earlier example, if the initial search query was "table" and the concept input was "marble top," second set of search results 902 may comprise tables with marble tops (as shown in FIG. 9). Additionally, although some search results may be included in both first set of search results 210 and second set of search results 902, second set of search results 902 may include search results not present in first set of search results 210. That is to say, in some cases, based on modified search query vector 804, search result identifier 122 does not merely filter first set of search results 210, but also provides additional search results (e.g., items) in second set of search results 902 that are not present in first set of search results 210. Such additional search results may be more relevant to the concept than search results of first set of search results 210.

Figure 10:
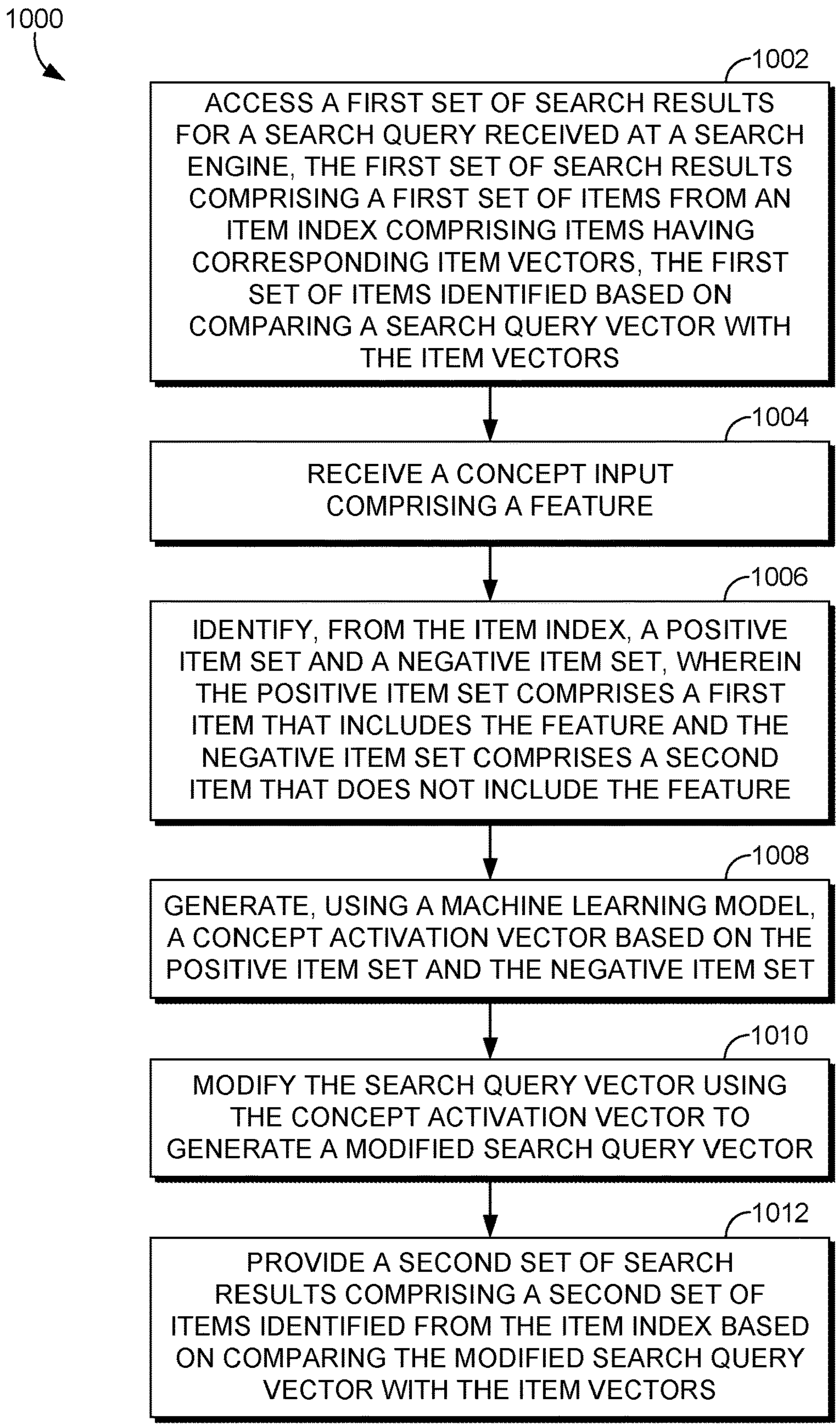
FIGS. 10-12 are example methods for providing search results, which can be performed by components of FIG. 1, in accordance with aspects described herein.
Figure 11:
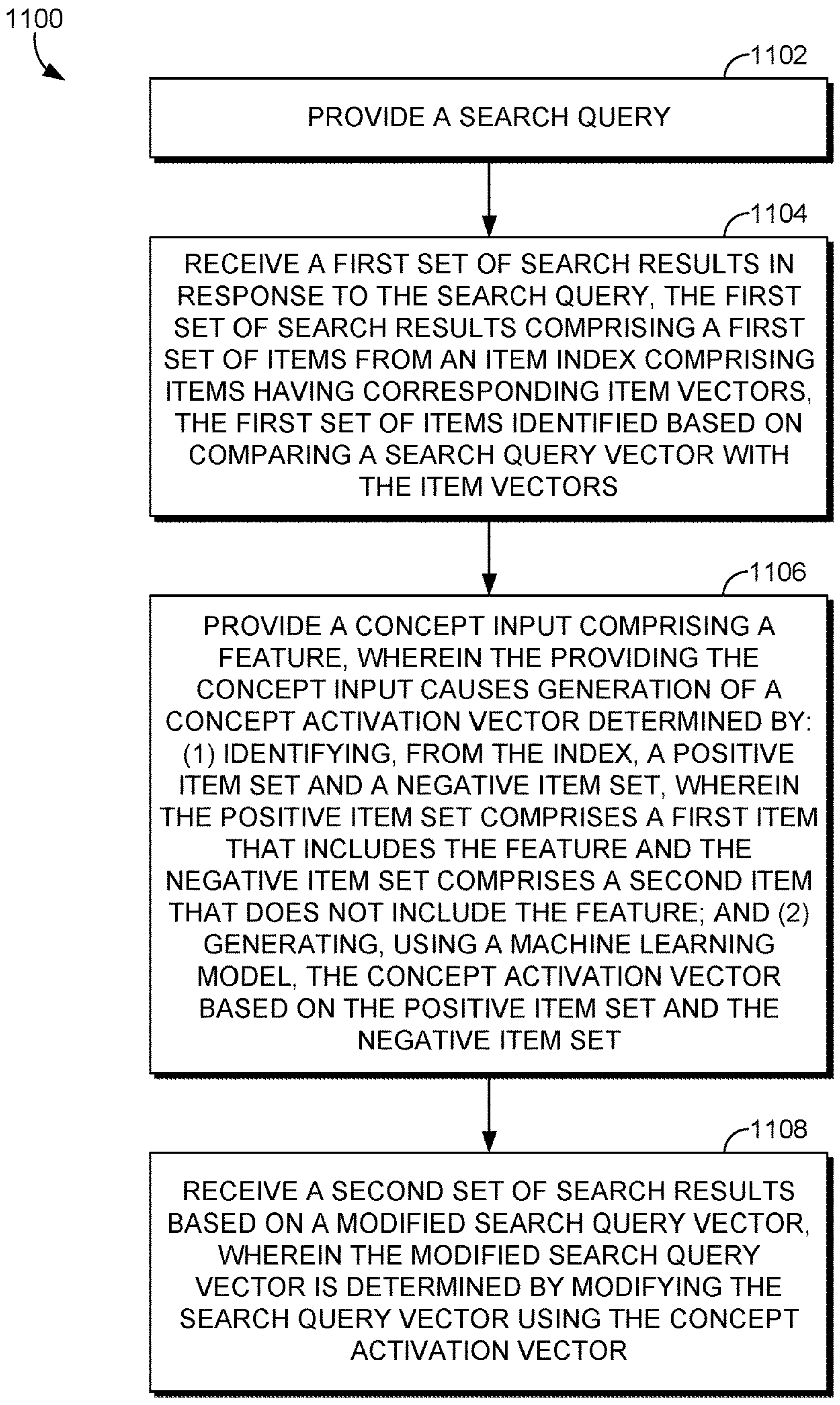
Figure 12:
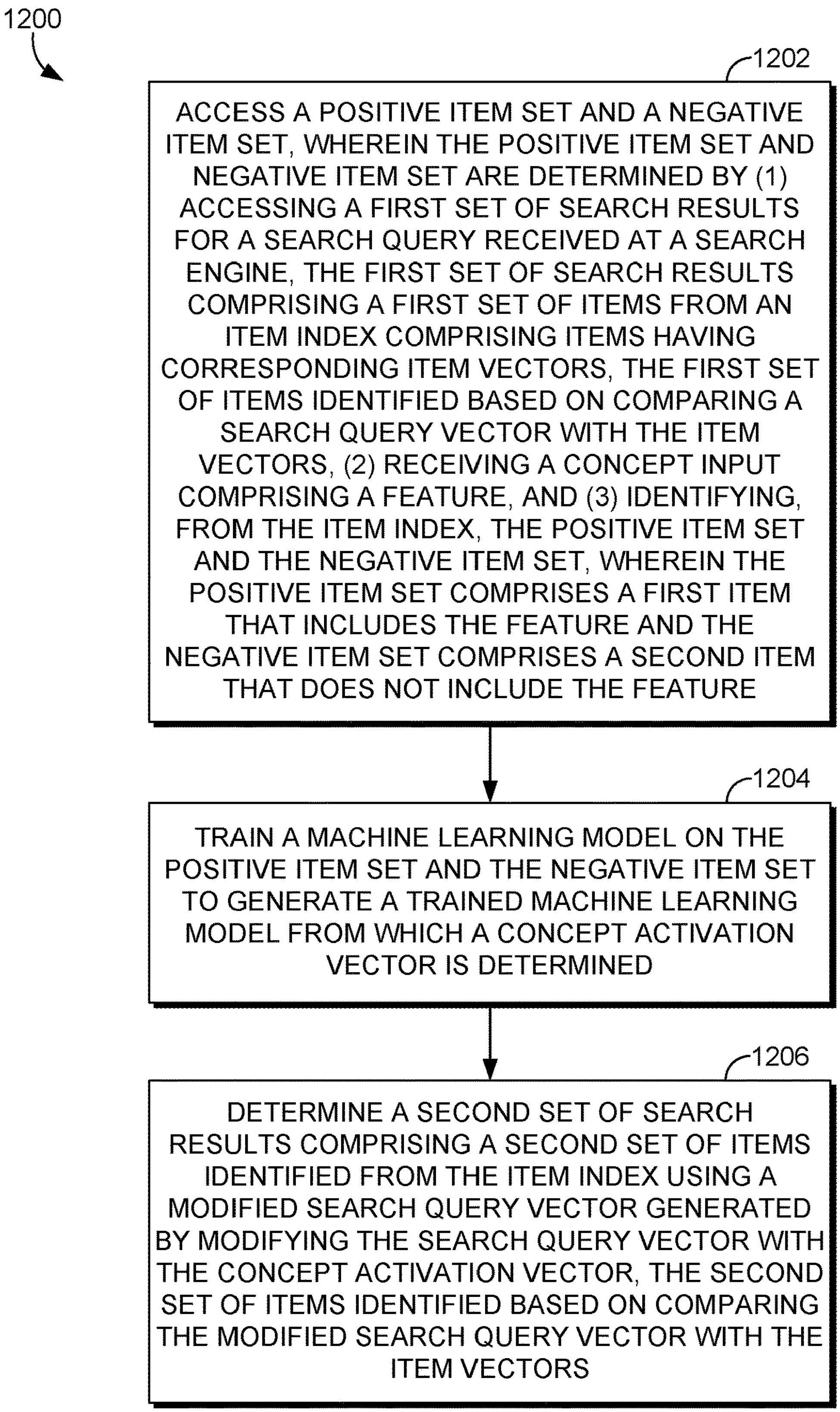

With reference to FIGS. 10-12, block diagrams are provided to illustrate methods for providing search results. The methods may be performed using search engine 110 of FIG. 1 and related components. In embodiments, one or more computer storage media having computer-executable instructions embodied thereon that, when executed by one or more processors, cause the one or more processors to perform the methods for providing search results.

Initially referring to FIG. 10, an example method 1000 for providing search results is provided. At block 1002, a first set of search results for a search query received at a search engine is accessed. This may be performed by search engine 110. The search results may be identified by search result identifier 122. The first set of search results may comprise a first set of items from an item index comprising items having corresponding item vectors, the first set of items identified based on comparing a search query vector with the item vectors. The item vectors may be generated by vector generator 120. The item index may be stored in datastore 106.

At block 1004, a concept input comprising a feature is received—e.g., by search engine 110. The concept input may be received over network 108 or from client computing device 104.

At block 1006, a positive item set and a negative item set are identified from the item index. This may be performed by item set identifier 124. The positive item set may comprise a first item that includes the feature, and the negative item set may comprise a second item that does not include the feature.

In some cases, the concept input may be a text string corresponding to the feature. In such cases, the method may further comprise identifying the first item by determining that the first item comprises the text string in a description of the first item or identifying the second item by determining that the second item does not comprise the text string in a description of the second item. This may be accomplished using item set identifier 124.

In some cases, the concept input may be a text string corresponding to the feature. In such cases, the method may further comprise identifying the first item by determining that a title of the first item comprises the text string or identifying the second item by determining that a title of the second item does not comprise the text string. This may be accomplished using item set identifier 124.

In some cases, the concept input may be an image comprising the feature. In such cases, the method may further comprise identifying the first item by determining that a description of the first item comprises the feature or identifying the second item by determining that a description of the second item does not comprise the feature. This may be accomplished using item set identifier 124. Additionally, in such cases, a text string may be determined that corresponds to the feature in the image, wherein the description of the first item comprises the text string, and wherein the description of the second item does not comprise the text string.

In some cases, the first item may be identified based on a positive item set threshold or the second item may be identified based on a negative item set threshold.

At block 1008, a concept activation vector is generated based on the positive item set and the negative item set using a machine learning model. This may be performed by CAV generator 126. In some cases, the generation of the concept activation vector may comprise determining a hyperplane located between item vectors of the positive item set and item vectors of the negative item set. Additionally, a direction of the concept activation vector may be determined, wherein the direction of the concept activation vector is orthogonal to the hyperplane and toward the item vectors of the positive item set. Additionally, in some cases, a length of the concept activation vector may be determined based on an amount of separation between the item vectors of the positive item set and the item vectors of the negative item set.

At block 1010, the search query vector is modified using the concept activation vector to generate a modified search query vector. This may be performed by search query vector modifier 128. In an example, the search query vector is modified by arithmetically adding the CAV to the search query vector to generate the modified search query vector.

At block 1012, a second set of search results comprising a second set of items identified from the item index based on comparing the modified search query vector with the item vectors may be identified. This may be performed by search result identifier 122.

Turning to FIG. 11, an example method 1100 for providing search results is provided. At block 1102, a search query is provided. This may be performed by client computing device 104.

At block 1104, a first set of search results is received in response to the search query. This may be performed by client computing device 104. The first set of search results may comprise a first set of items from an item index comprising items having corresponding item vectors, the first set of items identified based on comparing a search query vector with the item vectors.

At block 1106, a concept input comprising a feature is provided. This may be performed by client computing device 104. The providing the concept input may cause generation of a concept activation vector determined by: (1) identifying, from the index, a positive item set and a negative item set, wherein the positive item set comprises a first item that includes the feature and the negative item set comprises a second item that does not include the feature; and (2) generating, using a machine learning model, the concept activation vector based on the positive item set and the negative item set. The machine learning model may be a support-vector machine.

In some cases, the concept input may be a text string corresponding to the feature. In such cases, the method may further comprise identifying the first item by determining that the first item comprises the text string in a description of the first item or identifying the second item by determining that the second item does not comprise the text string in a description of the second item. This may be accomplished using item set identifier 124.

In some cases, the concept input may be a text string corresponding to the feature. In such cases, the method may further comprise identifying the first item by determining that a title of the first item comprises the text string or identifying the second item by determining that a title of the second item does not comprise the text string. This may be accomplished using item set identifier 124.

In some cases, the concept input may be an image comprising the feature. In such cases, the method may further comprise identifying the first item by determining that a description of the first item comprises the feature or identifying the second item by determining that a description of the second item does not comprise the feature. This may be accomplished using item set identifier 124. Additionally, in such cases, a text string may be determined that corresponds to the feature in the image, wherein the description of the first item comprises the text string, and wherein the description of the second item does not comprise the text string.

In some cases, the generation of the concept activation vector may comprise determining a hyperplane located between item vectors of the positive item set and item vectors of the negative item set. Additionally, a direction of the concept activation vector may be determined, wherein the direction of the concept activation vector is orthogonal to the hyperplane and toward the item vectors of the positive item set. Additionally, in some cases, a length of the concept activation vector may be determined based on an amount of separation between the item vectors of the positive item set and the item vectors of the negative item set.

At block 1108, a second set of search results is received. This may be performed by client computing device 104. The second set of search results may be based on a modified search query vector, wherein the modified search query vector is determined by modifying the search query vector using the concept activation vector.

Turning to FIG. 12, an example method 1200 for providing search results is provided. At block 1202, a positive item set and a negative item set are accessed. This may be performed by CAV generator 126. The positive item set and the negative item set may be determined by (1) accessing a first set of search results for a search query received at a search engine, the first set of search results comprising a first set of items from an item index comprising items having corresponding item vectors, the first set of items identified based on comparing a search query vector with the item vectors, (2) receiving a concept input comprising a feature, and (3) identifying, from the item index, the positive item set and the negative item set, wherein the positive item set comprises a first item that includes the feature and the negative item set comprises a second item that does not include the feature.

At block 1204, a machine learning model is trained on the positive item set and the negative item set to generate a trained machine learning model from which a concept activation vector is determined. This may be performed by CAV generator 126. The machine learning model may be a support-vector machine.

In some cases, the generation of the concept activation vector may comprise determining a hyperplane located between item vectors of the positive item set and item vectors of the negative item set. Additionally, a direction of the concept activation vector may be determined, wherein the direction of the concept activation vector is orthogonal to the hyperplane and toward the item vectors of the positive item set. Additionally, in some cases, a length of the concept activation vector may be determined based on an amount of separation between the item vectors of the positive item set and the item vectors of the negative item set.

At block 1206, a second set of search results comprising a second set of items identified from the item index using a modified search query vector is determined. This may be performed using search query vector modifier 128 and search result identifier 122. The modified search query vector may be generated by modifying the search query vector with the concept activation vector, the second set of items identified based on comparing the modified search query vector with the item vectors.

Figure 13:
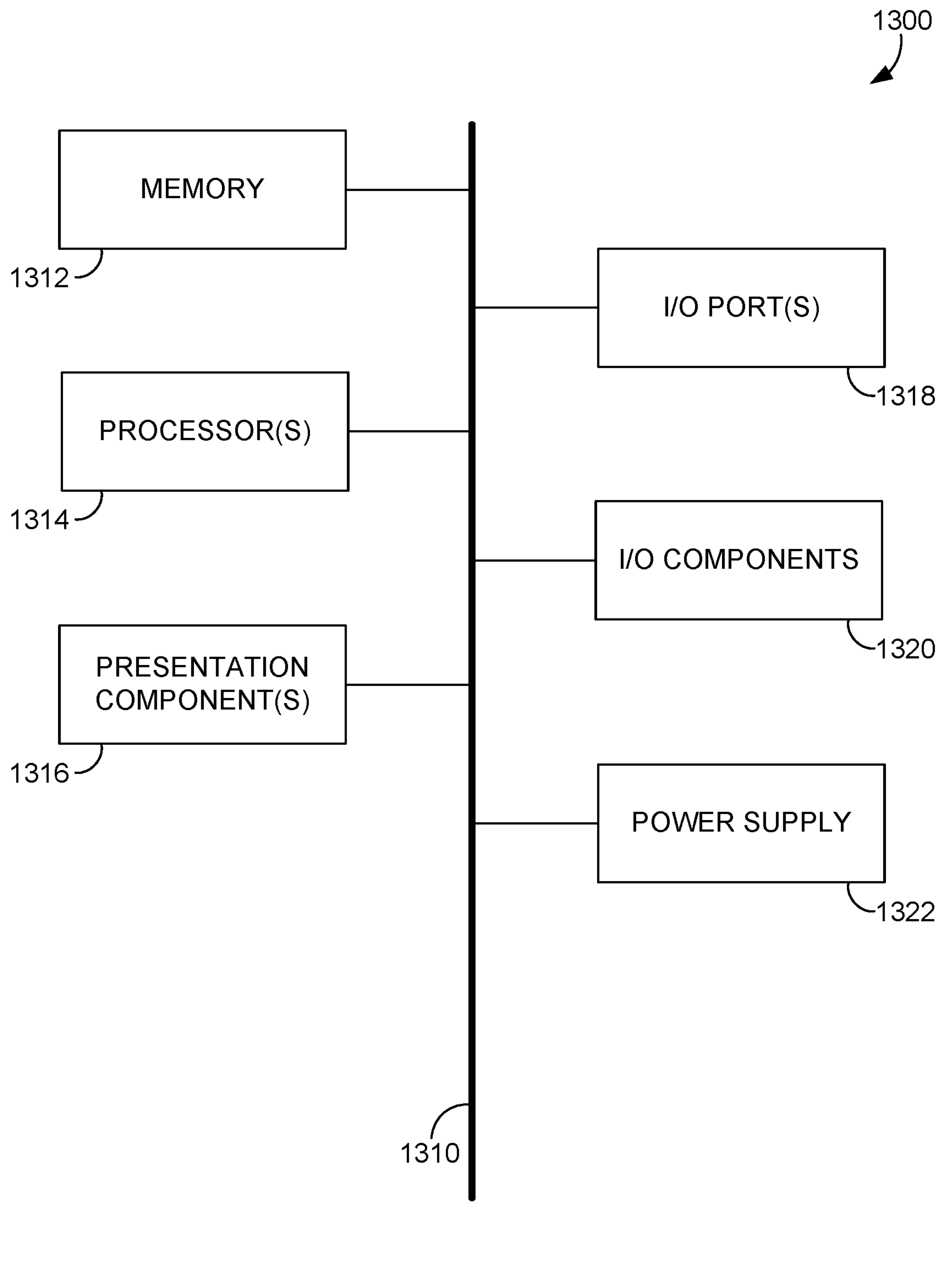
FIG. 13 is an example computing device suitable for implementing the described technology, in accordance with an aspect described herein.

Having described an overview of embodiments of the present technology, an example operating environment in which embodiments of the present technology may be implemented is described below in order to provide a general context for various aspects. Referring to FIG. 13, in particular, an example operating environment for implementing embodiments of the present technology is shown and designated generally as computing device 1300. Computing device 1300 is but one example of a suitable computing environment and is not intended to suggest any limitation as to the scope of use or functionality of the technology. Neither should computing device 1300 be interpreted as having any dependency or requirement relating to any one or combination of components illustrated.

The technology of the present disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The technology may be practiced in a variety of system configurations, including hand-held devices, consumer electronics, general-purpose computers, more specialty computing devices, etc. The technology may also be practiced in distributed computing environments where tasks are performed by remote-processing devices that are linked through a communications network.

With reference to FIG. 13, computing device 1300 includes bus 1310 that directly or indirectly couples the following devices: memory 1312, one or more processors 1314, one or more presentation components 1316, input/output ports 1318, input/output components 1320, and illustrative power supply 1322. Bus 1310 represents what may be one or more busses (such as an address bus, data bus, or combination thereof). Although the various blocks of FIG. 13 are shown with lines for the sake of clarity, in reality, delineating various components is not so clear, and metaphorically, the lines would more accurately be grey and fuzzy. For example, one may consider a presentation component, such as a display device, to be an I/O component. As another example, processors may also have memory. Such is the nature of the art, and it is again reiterated that the diagram of FIG. 13 merely illustrates an example computing device that can be used in connection with one or more embodiments of the present technology. Distinction is not made between such categories as "workstation," "server," "laptop," "hand-held device," etc., as all are contemplated within the scope of FIG. 13 and reference to "computing device."

Computing device 1300 typically includes a variety of computer-readable media. Computer-readable media can be any available media that can be accessed by computing device 1300 and includes both volatile and nonvolatile media, and removable and non-removable media. By way of example, and not limitation, computer-readable media may comprise computer storage media and communication media.

Computer storage media include volatile and nonvolatile, removable and non-removable media implemented in any method or technology for storage of information, such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1300. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 1312 includes computer storage media in the form of volatile or nonvolatile memory. The memory may be removable, non-removable, or a combination thereof. Example hardware devices include solid-state memory, hard drives, optical-disc drives, etc. Computing device 1300 includes one or more processors that read data from various entities such as memory 1312 or I/O components 1320. Presentation component(s) 1316 present data indications to a user or other device. Examples of presentation components include a display device, speaker, printing component, vibrating component, etc.

I/O ports 1318 allow computing device 1300 to be logically coupled to other devices including I/O components 1320, some of which may be built in. Illustrative components include a microphone, joystick, game pad, satellite dish, scanner, printer, wireless device, and so forth.

Embodiments described above may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of the present technology is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms "step" or "block" might be used herein to connote different elements of methods employed, the terms should not be interpreted as implying any particular order among or between various steps herein disclosed unless and except when the order of individual steps is explicitly stated.

For purposes of this disclosure, the word "including" or "having" has the same broad meaning as the word "comprising," and the word "accessing" comprises "receiving," "referencing," or "retrieving." Further, the word "communicating" has the same broad meaning as the word "receiving," or "transmitting" facilitated by software or hardware-based buses, receivers, or transmitters using communication media. Also, the word "initiating" has the same broad meaning as the word "executing or "instructing" where the corresponding action can be performed to completion or interrupted based on an occurrence of another action.

In addition, words such as "a" and "an," unless otherwise indicated to the contrary, include the plural as well as the singular. Thus, for example, the constraint of "a feature" is satisfied where one or more features are present. Furthermore, the term "or" includes the conjunctive, the disjunctive, and both (a or b thus includes either a or b, as well as a and b).

For purposes of a detailed discussion above, embodiments of the present technology are described with reference to a distributed computing environment; however, the distributed computing environment depicted herein is merely an example. Components can be configured for performing novel aspects of embodiments, where the term "configured for" or "configured to" can refer to "programmed to" perform particular tasks or implement particular abstract data types using code. Further, while embodiments of the present technology may generally refer to returning search results, it is understood that the techniques described may be extended to other implementation contexts.

From the foregoing, it will be seen that this technology is one well adapted to attain all the ends and objects described above, including other advantages that are obvious or inherent to the structure. It will be understood that certain features and subcombinations are of utility and may be employed without reference to other features and subcombinations. This is contemplated by and is within the scope of the claims. Since many possible embodiments of the described technology may be made without departing from the scope, it is to be understood that all matter described herein or illustrated in the accompanying drawings is to be interpreted as illustrative and not in a limiting sense.

The following clauses represent example aspects of concepts contemplated herein. Any one of the following clauses may be combined in a multiple dependent manner to depend from one or more other clauses. Further, any combination of dependent clauses (clauses that explicitly depend from a previous clause) may be combined while staying within the scope of aspects contemplated herein. The following clauses are examples and are not limiting.

Clause 1. Computer storage media storing computer-executable instructions that, when executed by at least one processor, cause the at least one processor to perform operations comprising: accessing a first set of search results for a search query received at a search engine, the first set of search results comprising a first set of items from an item index comprising items having corresponding item vectors, the first set of items identified based on comparing a search query vector with the item vectors; receiving a concept input comprising a feature; identifying, from the item index, a positive item set and a negative item set, wherein the positive item set comprises a first item that includes the feature and the negative item set comprises a second item that does not include the feature; generating, using a machine learning model, a concept activation vector based on the positive item set and the negative item set; modifying the search query vector using the concept activation vector to generate a modified search query vector; and providing a second set of search results comprising a second set of items identified from the item index based on comparing the modified search query vector with the item vectors.

Clause 2. The computer-implemented method of clause 1, wherein the concept input is a text string corresponding to the feature, and wherein the method further comprises: identifying the first item by determining that the first item comprises the text string in a description of the first item; and identifying the second item by determining that the second item does not comprise the text string in a description of the second item.

Clause 3. The computer-implemented method of any of clauses 1-2, wherein the concept input is a text string corresponding to the feature, and wherein the method further comprises: identifying the first item by determining that a title of the first item comprises the text string; and identifying the second item by determining that a title of the second item does not comprise the text string.

Clause 4. The computer-implemented method of clause 1, wherein the concept input is an image comprising the feature, and wherein the method further comprises: identifying the first item by determining that a description of the first item comprises the feature; and identifying the second item by determining that a description of the second item does not comprise the feature.

Clause 5. The computer-implemented method of clause 4, further comprising determining a text string corresponding to the feature in the image, wherein the description of the first item comprises the text string, and wherein the description of the second item does not comprise the text string.

Clause 6. The computer-implemented method of any of clauses 1-5, wherein the first item is identified based on a positive item set threshold, and wherein the second item is identified based on a negative item set threshold.

Clause 7. The computer-implemented method of any of clauses 1-6, wherein generating the concept activation vector using the machine learning model comprises: determining a hyperplane located between item vectors of the positive item set and item vectors of the negative item set; and determining a direction of the concept activation vector, wherein the direction of the concept activation vector is orthogonal to the hyperplane and toward the item vectors of the positive item set.

Clause 8. The computer-implemented method of any of clauses 1-7, wherein generating the concept activation vector using the machine learning model further comprises: determining a length of the concept activation vector based on an amount of separation between the item vectors of the positive item set and the item vectors of the negative item set.

Clause 9. A system comprising: at least one processor; and computer storage media storing computer-executable instructions that, when executed by the at least one processor, cause the at least one processor to perform operations comprising: providing a search query; receiving a first set of search results in response to the search query, the first set of search results comprising a first set of items from an item index comprising items having corresponding item vectors, the first set of items identified based on comparing a search query vector with the item vectors; providing a concept input comprising a feature, wherein the providing the concept input causes generation of a concept activation vector determined by: identifying, from the item index, a positive item set and a negative item set, wherein the positive item set comprises a first item that includes the feature and the negative item set comprises a second item that does not include the feature; and generating, using a machine learning model, the concept activation vector based on the positive item set and the negative item set; and receiving a second set of search results based on a modified search query vector, wherein the modified search query vector is determined by modifying the search query vector using the concept activation vector.

Clause 10. The system of clause 9, wherein the concept input is a text string corresponding to the feature, wherein the first item is identified by determining that the first item comprises the text string in a description of the first item, and wherein the second item is identified by determining that the second item does not comprise the text string in a description of the second item.

Clause 11. The system of any of clauses 9-10, wherein the concept input is a text string corresponding to the feature, wherein the first item is identified by determining that a title of the first item comprises the text string, and wherein the second item is identified by determining that a title of the second item does not comprise the text string.

Clause 12. The system of clause 9, wherein the concept input is an image comprising the feature, wherein the first item is identified by determining that a first image associated with the first item comprises the feature, and wherein the second item is identified by determining that a second image associated with the second item does not comprise the feature.

Clause 13. The system of any of clauses 9-12, wherein the machine learning model comprises a support-vector machine.

Clause 14. The system of any of clauses 9-13, wherein the concept activation vector is further generated by: determining a hyperplane located between item vectors of the positive item set and item vectors of the negative item set; and determining a direction of the concept activation vector, wherein the direction of the concept activation vector is orthogonal to the hyperplane and toward the item vectors of the positive item set.

Clause 15. The system of any of clauses 9-14, wherein the concept activation vector is further generated by: determining a length of the concept activation vector based on an amount of separation between the item vectors of the positive item set and the item vectors of the negative item set.

Clause 16. A computer-implemented method comprising: accessing a positive item set and a negative item set, wherein the positive item set and the negative item set are determined by: accessing a first set of search results for a search query received at a search engine, the first set of search results comprising a first set of items from an item index comprising items having corresponding item vectors, the first set of items identified based on comparing a search query vector with the item vectors; receiving a concept input comprising a feature; and identifying, from the item index, the positive item set and the negative item set, wherein the positive item set comprises a first item that includes the feature and the negative item set comprises a second item that does not include the feature; and training a machine learning model on the positive item set and the negative item set to generate a trained machine learning model from which a concept activation vector is determined; determining a second set of search results comprising a second set of items identified from the item index using a modified search query vector generated by modifying the search query vector with the concept activation vector, the second set of items identified based on comparing the modified search query vector with the item vectors.

Clause 17. The computer-implemented method of clause 16, wherein the concept input is a text string corresponding to the feature, wherein the first item is identified by determining that the first item comprises the text string in a description of the first item, and wherein the second item is identified by determining that the second item does not comprise the text string in a description of the second item.

Clause 18. The computer-implemented method of any of clauses 16-17, wherein the concept activation vector is further determined by: determining a hyperplane located between item vectors of the positive item set and item vectors of the negative item set; and determining a direction of the concept activation vector, wherein the direction of the concept activation vector is orthogonal to the hyperplane and toward the item vectors of the positive item set.

Clause 19. The computer-implemented method of any of clauses 16-18, wherein the concept activation vector is further determined by: determining a length of the concept activation vector based on an amount of separation between the item vectors of the positive item set and the item vectors of the negative item set.

Clause 20. The computer-implemented method of any of clauses 16-19, wherein the machine learning model is a support-vector machine.

We claim:

1. Computer storage media storing computer-executable instructions that, when executed by at least one processor, cause the at least one processor to perform operations comprising:

accessing a first set of search results for a search query received at a search engine, the first set of search results comprising a first set of items from an item index comprising items having corresponding item vectors, the first set of items identified based on comparing a search query vector with the item vectors;

receiving a concept input comprising a feature;

identifying, from the item index, a positive item set and a negative item set, wherein the positive item set comprises a first item that includes the feature and the negative item set comprises a second item that does not include the feature;

generating, using a machine learning model, a concept activation vector based on the positive item set and the negative item set;

modifying the search query vector using the concept activation vector to generate a modified search query vector; and providing a second set of search results comprising a second set of items identified from the item index based on comparing the modified search query vector with the item vectors.

2. The computer-implemented method of claim 1, wherein the concept input is a text string corresponding to the feature, and wherein the method further comprises:

identifying the first item by determining that the first item comprises the text string in a description of the first item; and identifying the second item by determining that the second item does not comprise the text string in a description of the second item.

3. The computer-implemented method of claim 1, wherein the concept input is a text string corresponding to the feature, and wherein the method further comprises:

identifying the first item by determining that a title of the first item comprises the text string; and identifying the second item by determining that a title of the second item does not comprise the text string.

4. The computer-implemented method of claim 1, wherein the concept input is an image comprising the feature, and wherein the method further comprises:

identifying the first item by determining that a description of the first item comprises the feature; and identifying the second item by determining that a description of the second item does not comprise the feature.

5. The computer-implemented method of claim 4, further comprising determining a text string corresponding to the feature in the image, wherein the description of the first item comprises the text string, and wherein the description of the second item does not comprise the text string.

6. The computer-implemented method of claim 1, wherein the first item is identified based on a positive item set threshold, and wherein the second item is identified based on a negative item set threshold.

7. The computer-implemented method of claim 1, wherein generating the concept activation vector using the machine learning model comprises:

determining a hyperplane located between item vectors of the positive item set and item vectors of the negative item set; and determining a direction of the concept activation vector, wherein the direction of the concept activation vector is orthogonal to the hyperplane and toward the item vectors of the positive item set.

8. The computer-implemented method of claim 7, wherein generating the concept activation vector using the machine learning model further comprises:

determining a length of the concept activation vector based on an amount of separation between the item vectors of the positive item set and the item vectors of the negative item set.

9. A system comprising:
at least one processor; and
computer storage media storing computer-executable instructions that, when executed by the at least one processor, cause the at least one processor to perform operations comprising:
providing a search query;
receiving a first set of search results in response to the search query, the first set of search results comprising a first set of items from an item index comprising items having corresponding item vectors, the first set of items identified based on comparing a search query vector with the item vectors;
providing a concept input comprising a feature, wherein the providing the concept input causes generation of a concept activation vector determined by:
identifying, from the item index, a positive item set and a negative item set, wherein the positive item set comprises a first item that includes the feature and the negative item set comprises a second item that does not include the feature; and
generating, using a machine learning model, the concept activation vector based on the positive item set and the negative item set; and
receiving a second set of search results based on a modified search query vector, wherein the modified search query vector is determined by modifying the search query vector using the concept activation vector.

10. The system of claim 9, wherein the concept input is a text string corresponding to the feature, wherein the first item is identified by determining that the first item comprises the text string in a description of the first item, and wherein the second item is identified by determining that the second item does not comprise the text string in a description of the second item.

11. The system of claim 10, wherein the concept input is a text string corresponding to the feature, wherein the first item is identified by determining that a title of the first item comprises the text string, and wherein the second item is identified by determining that a title of the second item does not comprise the text string.

12. The system of claim 9, wherein the concept input is an image comprising the feature, wherein the first item is identified by determining that a first image associated with the first item comprises the feature, and wherein the second item is identified by determining that a second image associated with the second item does not comprise the feature.

13. The system of claim 9, wherein the machine learning model comprises a support-vector machine.

14. The system of claim 9, wherein the concept activation vector is further generated by:
determining a hyperplane located between item vectors of the positive item set and item vectors of the negative item set; and
determining a direction of the concept activation vector, wherein the direction of the concept activation vector is orthogonal to the hyperplane and toward the item vectors of the positive item set.

15. The system of claim 14, wherein the concept activation vector is further generated by:
determining a length of the concept activation vector based on an amount of separation between the item vectors of the positive item set and the item vectors of the negative item set.

16. A computer-implemented method comprising:
accessing a positive item set and a negative item set, wherein the positive item set and the negative item set are determined by:
accessing a first set of search results for a search query received at a search engine, the first set of search results comprising a first set of items from an item index comprising items having corresponding item vectors, the first set of items identified based on comparing a search query vector with the item vectors;
receiving a concept input comprising a feature; and
identifying, from the item index, the positive item set and the negative item set, wherein the positive item set comprises a first item that includes the feature and the negative item set comprises a second item that does not include the feature; and
training a machine learning model on the positive item set and the negative item set to generate a trained machine learning model from which a concept activation vector is determined;
determining a second set of search results comprising a second set of items identified from the item index using a modified search query vector generated by modifying the search query vector with the concept activation vector, the second set of items identified based on comparing the modified search query vector with the item vectors.

17. The computer-implemented method of claim 16, wherein the concept input is a text string corresponding to the feature, wherein the first item is identified by determining that the first item comprises the text string in a description of the first item, and wherein the second item is identified by determining that the second item does not comprise the text string in a description of the second item.

18. The computer-implemented method of claim 16, wherein the concept activation vector is further determined by:
determining a hyperplane located between item vectors of the positive item set and item vectors of the negative item set; and
determining a direction of the concept activation vector, wherein the direction of the concept activation vector is orthogonal to the hyperplane and toward the item vectors of the positive item set.

19. The computer-implemented method of claim 18, wherein the concept activation vector is further determined by:
determining a length of the concept activation vector based on an amount of separation between the item vectors of the positive item set and the item vectors of the negative item set.

20. The computer-implemented method of claim 16, wherein the machine learning model is a support-vector machine.

* * * * *